US011222554B2

(12) United States Patent
Balabine et al.

(10) Patent No.: US 11,222,554 B2
(45) Date of Patent: Jan. 11, 2022

(54) METHOD, APPARATUS, AND COMPUTER-READABLE MEDIUM FOR FORMAT PRESERVING ENCRYPTION OF A NUMERICAL VALUE

(71) Applicant: Informatica LLC, Redwood City, CA (US)

(72) Inventors: Igor Balabine, Menlo Park, CA (US); Rajagopal Guduru, Sunnyvale, CA (US); Ramesh Nallamothu, Sunnyvale, CA (US)

(73) Assignee: INFORMATICA LLC, Redwood City, CA (US)

( * ) Notice: Subject to any disclaimer, the term of this patent is extended or adjusted under 35 U.S.C. 154(b) by 26 days.

(21) Appl. No.: 16/542,899

(22) Filed: Aug. 16, 2019

(65) Prior Publication Data
US 2021/0049935 A1 Feb. 18, 2021

(51) Int. Cl.
G06F 21/00 (2013.01)
G09C 1/00 (2006.01)
(52) U.S. Cl.
CPC .................................. G09C 1/00 (2013.01)
(58) Field of Classification Search
CPC ........................................................ G09C 1/00
See application file for complete search history.

(56) References Cited

U.S. PATENT DOCUMENTS

| 9,313,179 B1* | 4/2016 | Yung ................... G06F 21/6227 |
| 10,891,366 B1* | 1/2021 | Wu ........................ H04L 9/0894 |
| 2014/0229716 A1* | 8/2014 | Gueron ................. G06F 9/3001 712/222 |
| 2014/0344932 A1* | 11/2014 | Polychronakis ........ G06F 21/54 726/23 |
| 2015/0104151 A1* | 4/2015 | Webb ................... G11B 27/031 386/241 |

* cited by examiner

Primary Examiner — Anthony D Brown
Assistant Examiner — Rodman Alexander Mahmoudi
(74) Attorney, Agent, or Firm — Amardeep S. Grewal; Reed Smith LLP

(57) ABSTRACT

A system, method and computer-readable medium format-preserving encryption of a numerical value, including storing a binary numerical value, the binary numerical value comprising a plurality of binary bits, dividing the plurality of binary bits into a plurality of bit groups and storing the plurality of bit groups in a plurality of bytes, encrypting each byte in the plurality of bytes using a radix value corresponding to a quantity of binary bits in a bit group corresponding to that byte to generate a plurality of ciphertext bytes, and combining a quantity of least-significant bits from each ciphertext byte in the plurality of ciphertext bytes to generate a binary ciphertext value, the quantity of least-significant bits combined from each ciphertext byte corresponding to the radix value used to generate that ciphertext byte.

20 Claims, 17 Drawing Sheets

700 Number in IEEE 754 single-precision 32-bit floating point format

| S | EXP (8 bits) | MANTISSA (23 bits) |

702  703  704

701 Number in IEEE 754 double-precision 64-bit floating point format

| S | EXP (11 bits) | MANTISSA (52 bits) |

METHOD, APPARATUS, AND COMPUTER-READABLE MEDIUM FOR FORMAT PRESERVING ENCRYPTION OF A NUMERICAL VALUE

BACKGROUND

Format Preserving Encryption (FPE) is a cryptographic technique that retains the format of the original plaintext in a derived ciphertext, including the length of the original plaintext and the alphabet used in the original plaintext. For example, an FPE encrypted character string representing a credit card number would preserve the original length of the credit card and be composed of digits.

FPE can be used to generate realistic ciphertext by encrypting subsets of characters within a character string according to the alphabets appearing within the corresponding subsets. For example, if the first four digits of a plaintext credit card number include values in the 0-4 range, then the first four digits of the ciphertext credit card number can also be limited to the 0-4 range.

FPE provides a number of advantages. Ciphertext created using FPE is able to pass validity checks, such as Lunh check digit validation. Additionally, FPE allows for the creation of realistic looking encrypted data objects which derive their properties from the original plaintext data objects and thereby safeguard privacy of the original information by creating the illusion that the ciphertext objects are plaintext data objects.

Standard FPE encryption algorithms include two format preserving encryption algorithms, FF1 and FF3, that have been approved by National Institute of Standards and Technology (NIST) for use with the NIST approved Advanced Encryption Standard (AES) and Triple Data Encryption Algorithm (TDEA).

Standard FPE algorithms are based on standard symmetric cryptographic methods such as the AES block cipher. In addition to a cryptographic key, standard FPE algorithms utilize two initialization vectors called "tweaks." By changing the tweaks, variability of the ciphertext is achieved for the identical instances of a plaintext. An additional parameter of a standard FPE algorithm is the "base"—the number of characters in an alphabet which comprise a data object or a part of data object. The base is denoted by "radix." If a data object is comprised of more than one logical character set, such as a mix of letters and digits, each of the logical character sets may be represented by a distinct base.

Standard FPE algorithms are designed for encrypting character data. Numeric data of integral types (e.g., an n-bit integer) may be encrypted in a size preserving manner by applying a n-bit block cipher. For example, a 128-bit block cipher is approved for general-purpose use with AES and a 64-bit block cipher is approved for general-purpose use with TDEA.

As discussed above, existing FPE algorithms rely on character level encryption, even when applied to numerical data. This character level encryption can create memory overflow problems when encrypting numerical data. In particular, when the generated ciphertext is converted back into a numerical representation, the size of the ciphertext number can often exceed the block of memory that was originally allocated to the plaintext number. For example, a 16-bit integer value can have values ranging between 0-65535. If an integer having a value of "34212" is encrypted on a character level, the result could exceed the 16 bits allocated to store the integer, since character level encryption does not account for the integer data type. For example, a ciphertext value of "67535" would require 17 bits to store as an integer.

Given the wide variety of numeric formats and numeric data types, a cryptographic standards compliant method and system for encrypting such data objects in a data type consistent form is needed.

BRIEF DESCRIPTION OF THE DRAWINGS

FIG. 7 illustrates Institute of Electrical and Electronics Engineers (IEEE) 754 standard floating point numbers.

DETAILED DESCRIPTION

While methods, apparatuses, and computer-readable media are described herein by way of examples and embodiments, those skilled in the art recognize that methods, apparatuses, and computer-readable media for format-preserving encryption of a numerical value are not limited to the embodiments or drawings described. It should be understood that the drawings and description are not intended to be limited to the particular forms disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," "includes", "comprise," "comprises," and "comprising" mean including, but not limited to.

Figure 1:
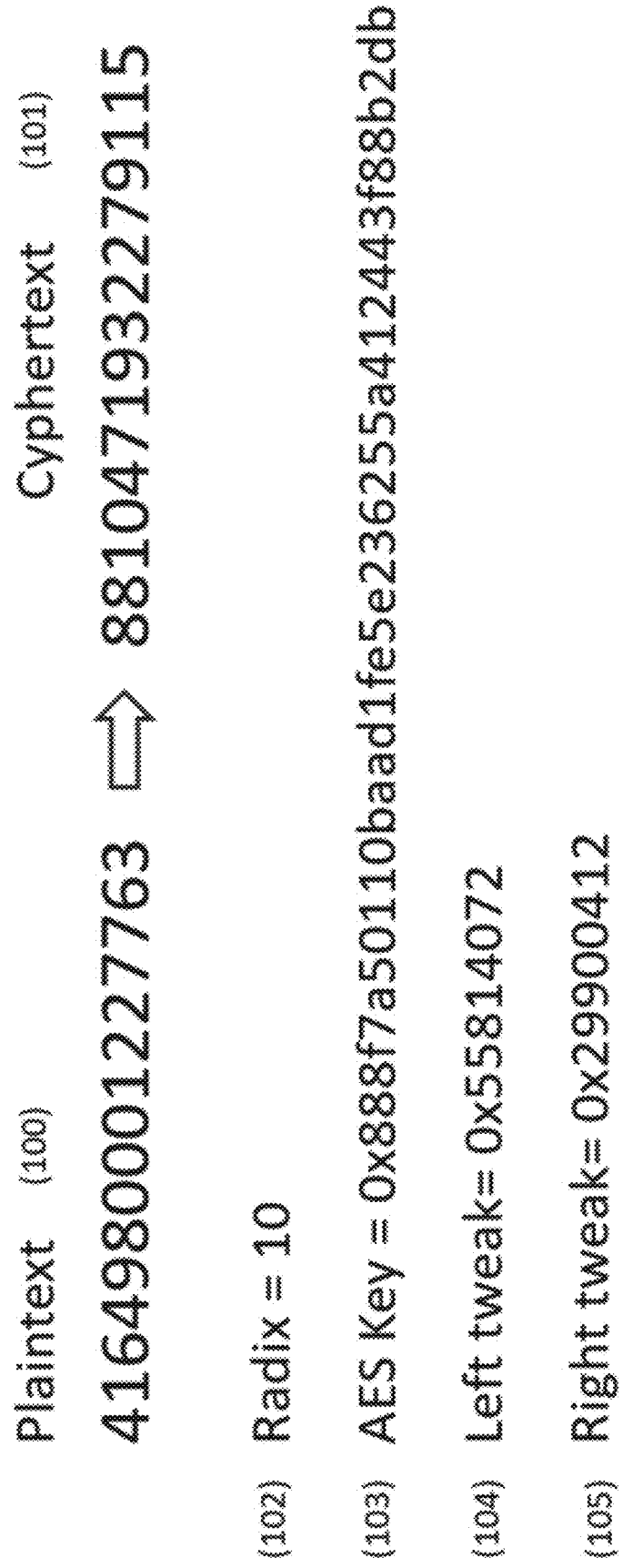
FIG. 1 illustrates the application of an FPE algorithm to a plaintext character string 100 representing a credit card number

As discussed above, standard format preserving encryption (FPE) algorithms operate on a textual, character-level, basis. FIG. 1 illustrates the application of an FPE algorithm to a plaintext character string 100 representing a credit card number. Since plaintext character string 100 is comprised of digits between 0 and 9, the size of the alphabet which represents credit card numbers is 10, resulting in a radix value 102 of 10. The standard FPE computation also utilizes a 16-byte long Advanced Encryption Standard (AES) key 103, a 32-bit long left tweak 104 and a 32-bit long right tweak 105. The values of the AES key 103, the left tweak 104, and the right tweak 105 are shown in hexadecimal notation for the purpose of brevity, but it would be understood by those skilled in the art that these hexadecimal values represent underlying binary values. As shown in FIG. 1, the FPE encryption algorithm transforms the plaintext credit card number 100 into a cyphertext 101 which belongs to same domain of 16-digit long character strings as the plaintext credit card number 100.

While the approach illustrated in FIG. 1 works well for numeric values represented by text characters, they are situations where it is not applicable to binary numeric values. For illustrational purposes only and without any limitations we assume that binary values discussed with reference to the figures are presented in the network ("big endian") byte order.

Figure 2:
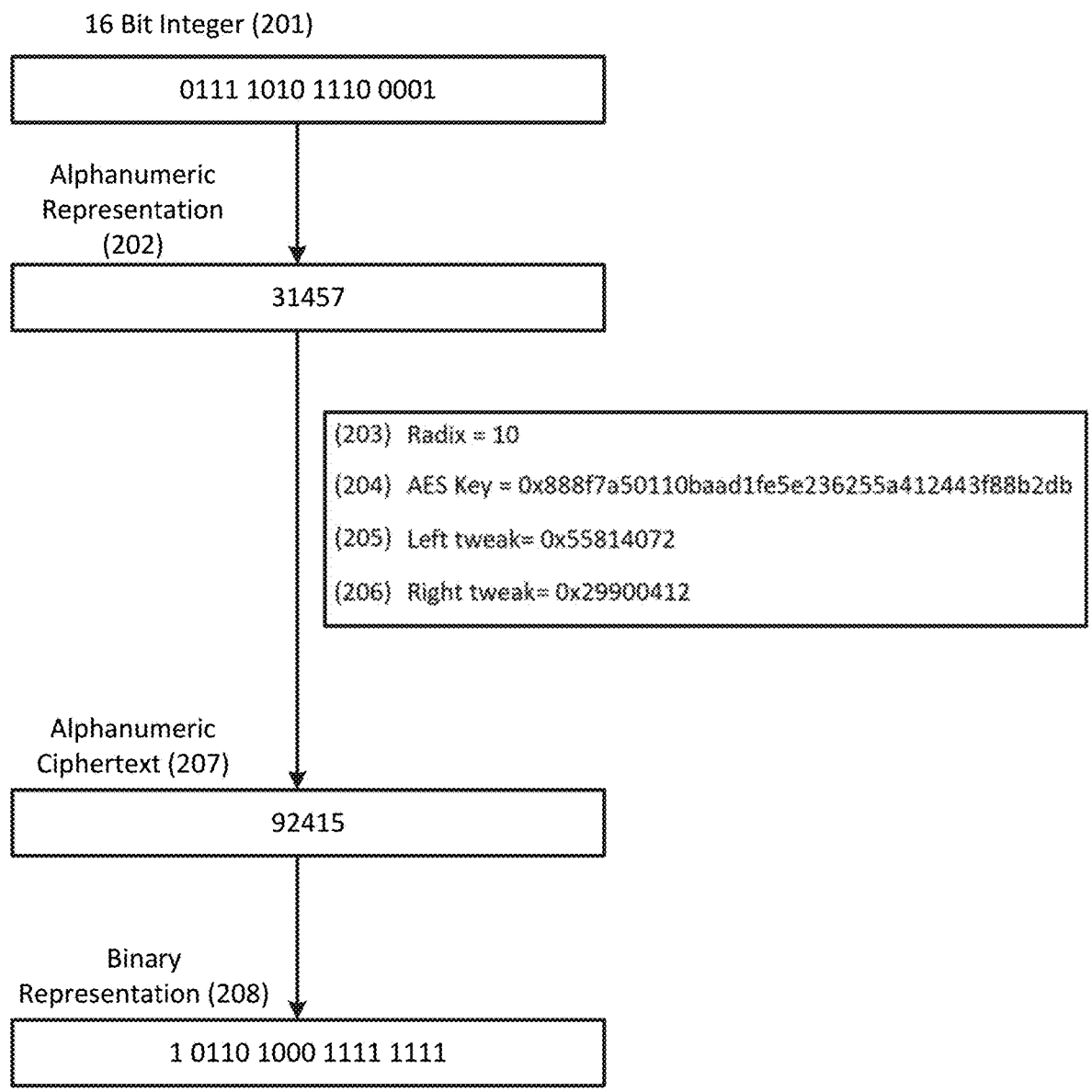
FIG. 2 illustrates the application of standard FPE algorithms to a 16 bit integer.

FIG. 2 illustrates the application of standard FPE algorithms to a 16 bit integer 201. The 16 bit integer 201 is represented in alphanumeric form 202 prior to application of the FPE algorithm. As shown in FIG. 2, the FPE algorithm is then applied with a Radix value 203 of 10 (corresponding to 10 possible characters at each location), an AES Key 204, left tweak 205, and right tweak 206.

The result of the FPE algorithm is alphanumeric ciphertext 207. However, as shown in FIG. 2, once the alphanumeric ciphertext 207 is converted back into a binary representation 208, the number of bits required to store the value is 17, exceeding the 16 bit integer size.

The problem illustrated by the example in FIG. 2 prevents protection of data represented by integer types such as SMALLINT, INTEGER and BIGINT in the databases due to a potential memory overflow of the ciphertext value. To overcome loss of data traditional solutions, users must resort to changing the database schema to use larger integer data types such as changing SMALLINT fields to be INTEGER and INTEGER fields to BIGINT. This approach wastes storage space in order to accommodate potential overflow issues resulting from encryption. Additionally, this approach requires a cumbersome process of creating a new database schema, copying the original data to a new location, validating copied data, etc. This sequence of operations is frequently complex and error prone, and can result in data loss, data corruption, or both.

Furthermore, within the security context, even if larger ciphertext values could be stored, the traditional approach of applying standard FPE to alphanumeric representations of numeric values creates a security vulnerability. In particular, an attacker is able to discern encrypted data by noticing that the ciphertext values are outside of the range of the original data universe of discourse.

It will be appreciated that the problem illustrated in FIG. 2 affects cryptographic transforms of integral (integer based) data types in general and not only 16 bit integer ("int") data types. For example, floating point objects, timestamps, and decimal data types also suffer from the above-mentioned drawbacks when standard FPE algorithms are used to perform encryption.

The inventors have discovered a method, apparatus, and computer-readable medium for performing FPE that overcomes the above-mentioned technical challenges and preserves not only the format of plaintext data to be encrypted, but also the data type of the data to be encrypted. This solution eliminates the problem of memory overflow and can be implemented without increasing storage size of data types to accommodate potential overflow issues caused by encryption. Applicant notes that several of the binary values discussed in this application are represented in hexadecimal format for clarity and ease of reference. It is appreciated that these values would be stored in a binary format in memory.

Figure 3:
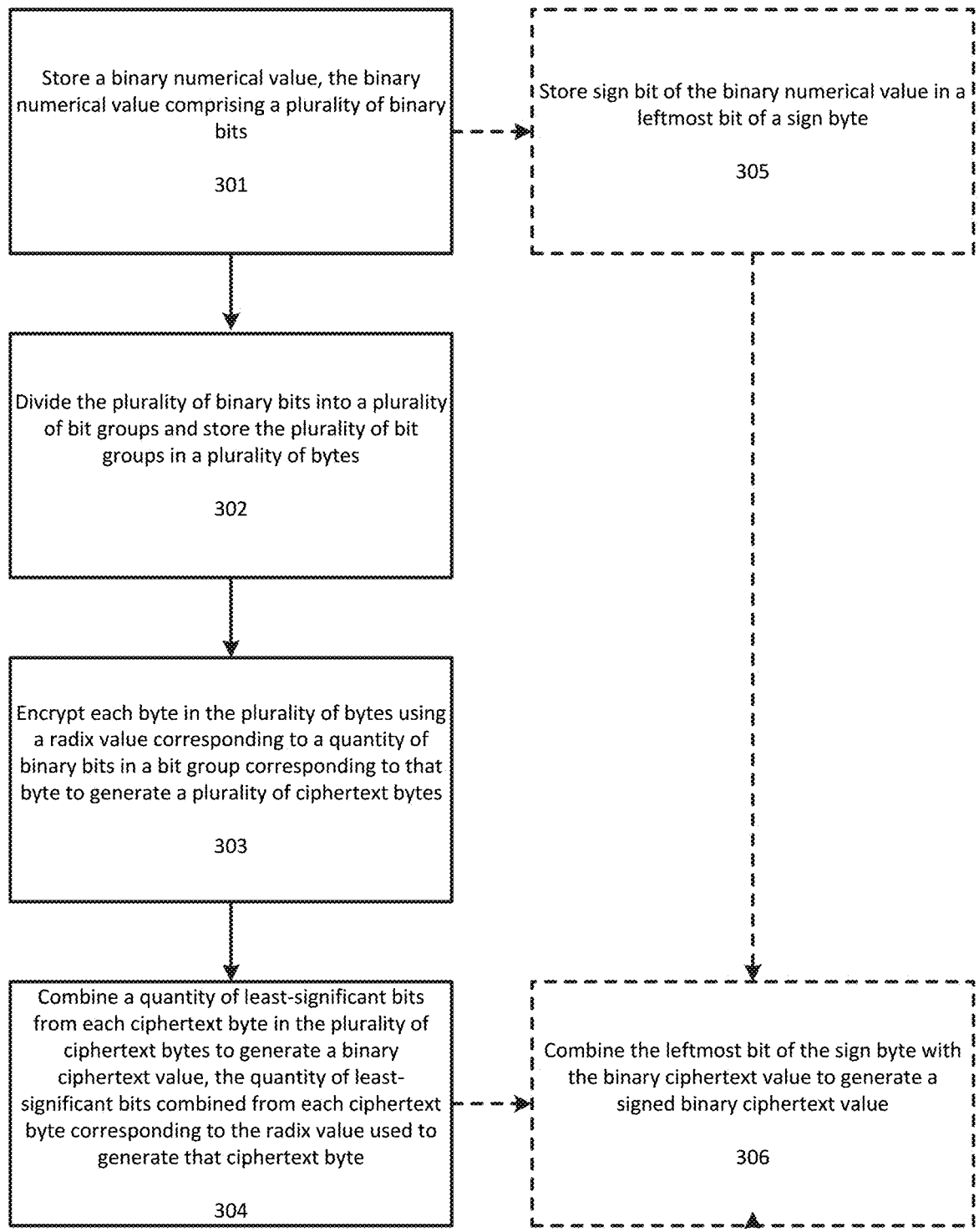
FIG. 3 illustrates a flowchart for format-preserving encryption of a numerical value according to an exemplary embodiment.

FIG. 3 illustrates a flowchart for format-preserving encryption of a numerical value according to an exemplary embodiment.

At step 301 a binary numerical value is stored. The binary numerical value can be received from an executing process and/or as part of a request. For example, binary numerical value can be passed in as an argument in a function call (such as an encryption request). The binary numerical value can also be stored in a database and passed to an encryption as an argument by reference, meaning a memory location of the stored binary numerical value is passed to the function.

The binary numerical value can be any type of numerical data type that is represented using a predefined number and/or range of bits within a computer storage system, such as an "integer" type, a "floating point" (float) type, a "smallint" type, a "decimal" type, a "numeric" type, a "real" type, and/or a "double" type. It is understood that the binary numerical value can represent any number and is itself not limited to being just 0 or 1 (unless it is a Boolean data type). Therefore, the "binary" aspect of the numerical value refers to the bits used to store all values having the same data type as the binary numerical value.

The binary numerical value comprises a plurality of bits. In the case of an integer data type as is commonly used in SQL databases, the binary numerical value can comprise 16 bits. In the case of a float data type, the binary numerical value can comprise 32 bits or 64 bits. Many variations are possible and these examples are not intended to be limiting.

Figure 4:
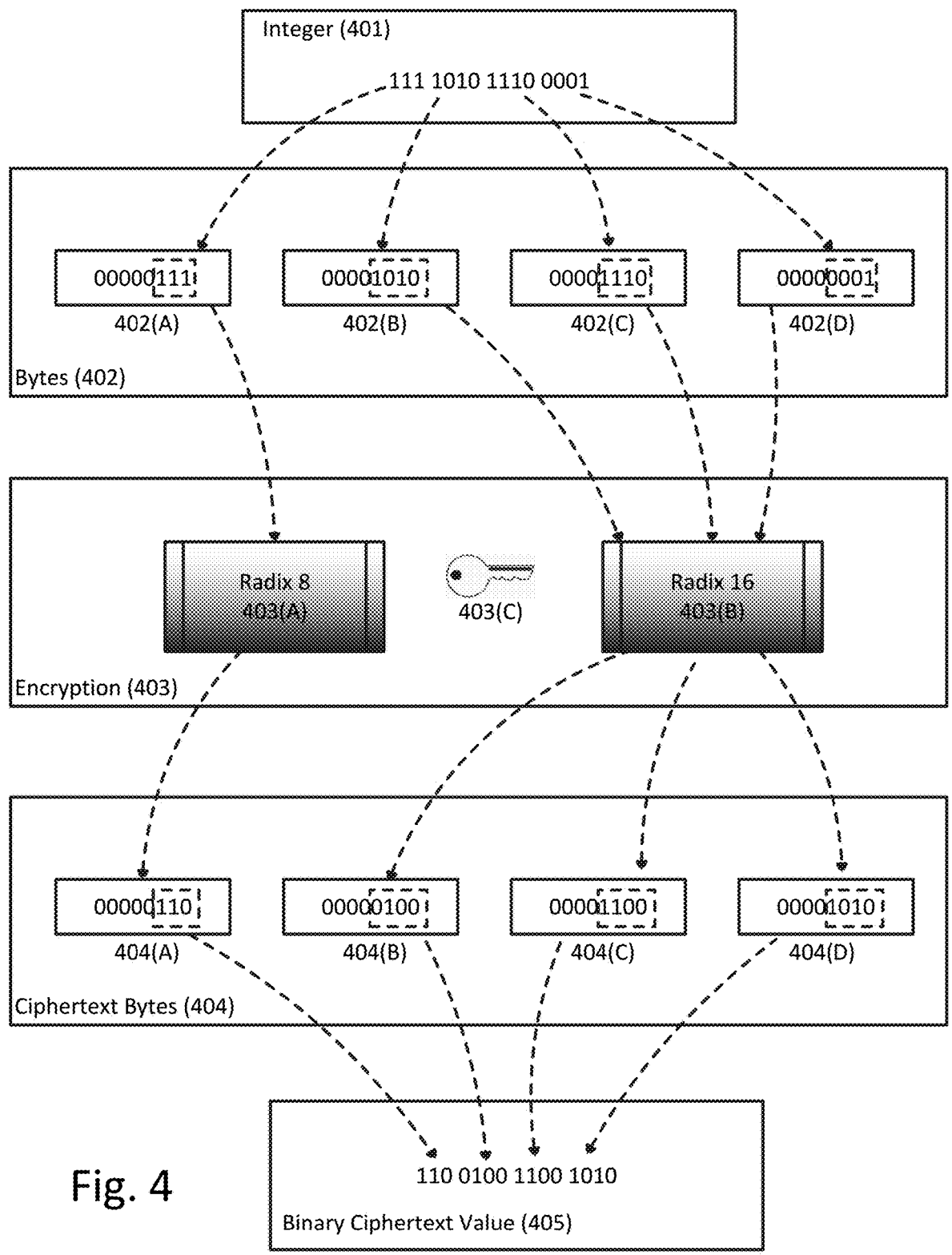
FIG. 4 illustrates an example of format-preserving encryption of a numerical value according to an exemplary embodiment.

FIG. 4 illustrates an example of format-preserving encryption of a numerical value according to an exemplary embodiment. As shown in FIG. 4, the stored binary numerical value is integer 401, which is represented by 15 bits. In this case, the binary numerical value 401 is 111 1010 1110 0001, which corresponds to the decimal value "31457." If the integer is stored or read in decimal notation then it can be converted into binary notation.

Returning to FIG. 3, at step 302 the plurality of binary bits in the binary numerical value are divided into a plurality of bit groups and the plurality of bit groups are stored in a plurality of bytes. This step begins with the least significant bits of the binary numerical value and stores each successive set of 4 bits (referred to herein as a "half-byte" or "nibble") into the 4 least significant bits of a separate byte, with the 4 most significant bits of each separate byte being set to 0. One of skill in the art would understand the term "least significant" to refer to the rightmost bit(s) of a binary value and the term "most significant" to refer to the leftmost bit(s) of a binary value.

This step traverses from the least significant bit to the most significant bit in the binary numerical value, placing 4 bit groupings into separate bytes as it encounters them. Any remaining bits in the binary numerical value that are less than 4 bits long are placed into their own separate byte. For example, in the case of a 14 bit integer, there would be 2 remaining bits after the 12 least significant bits have been placed into 3 separate bytes. In this case, the 2 remaining bits would be placed into their own byte, with the remaining most significant bits in that byte (6 bits) being set to 0.

FIG. 4 illustrates the step of dividing the plurality of binary bits in the binary numerical value 401 into a plurality of bytes 402. As shown in FIG. 4, the 4 least significant bits in binary numerical value 401 are placed into byte 402(D), the next 4 least significant bits in binary numerical value 401 are placed into byte 402(C), the next 4 least significant bits in binary numerical value 401 are placed into byte 402(B), and the remaining 3 bits in binary numerical value 401 are placed into byte 402(A). In the example shown in FIG. 4, there are four bit groups that are generated by dividing the binary numerical value 401. The four bit groups are {0001}, {1110}, {1010}, and {111}, and these bit groups are stored, respectively, in bytes 402(D), 402(C), 402(B), and 402(A).

Returning to FIG. 3, at step 303 each byte in the plurality of bytes is encrypted using a radix value corresponding to a quantity of binary bits in a bit group corresponding to that byte to generate a plurality of ciphertext bytes. The quantity of binary bits within the bit group that is stored in (and corresponds to) each byte is used to determine the radix value during encryption because the total number of bits in each byte is always 8, and if a radix value of 8 were to be used, the resulting ciphertext byte could exceed the number of bits in the original plaintext bit group that was added to the byte. Specifically, the radix value used to encrypt a byte can be determined as the maximum number of possible values representable by the quantity of binary bits in a bit group corresponding to that byte.

So, for example, if the bit group "011" was stored in its own byte in step 302, then that byte would be encrypted using radix 8, since there are eight possible values of three bits. Similarly, if the bit group "11" was stored in its own byte in step 302, then that byte would be encrypted using radix 4, since there are four possible values of two bits. In another example, if the bit group "0000" was stored in its own byte in step 302, then that byte would be encrypted using radix 16, since there are sixteen possible values of four bits.

During the encryption step 303, each byte in the plurality of bytes can be individually encrypted with a format preserving encryption algorithm using an encryption key K and left and right tweaks (TL and TR), with the radix value for each byte being determined as discussed above.

The encryption step 403 of each byte is shown in FIG. 4. As shown in that figure, bytes 402(B), 402(C), 402(D) are all encrypted using Radix 16 403(B) because the bit groups corresponding to those bytes all have 4 bits ("1010," "1110," and "0001" respectively). Additionally, byte 402(A) is encrypted using Radix 8 403(A) because that byte has 3 bits in the corresponding bit group ("111") added to that byte in the previous dividing and storing step. The use of a radix value corresponding to the quantity of bits in each bit group stored in each byte ensures that the resulting ciphertext bytes stay within the universe of discourse of the plaintext bytes and that the ultimate ciphertext value stays within the universe of discourse of the original plaintext value. Of course, the encryption step 403 will also utilize an encryption key 403(C) and left and right tweaks (not shown), as discussed earlier.

The result of the encryption step (403) is a plurality of ciphertext bytes (404), including ciphertext byte 404(A) corresponding to byte 402(A), ciphertext byte 404(B) corresponding to byte 402(B), ciphertext byte 404(C) corresponding to byte 402(C), and ciphertext byte 404(D) corresponding to byte 402(D).

Returning to FIG. 3, at step 304 a quantity of least-significant bits from each ciphertext byte in the plurality of ciphertext bytes are combined to generate a binary ciphertext value. The quantity of least-significant bits combined from each ciphertext byte corresponds to the radix value used to generate that ciphertext byte. This ensures that only the bits that encompass the universe of discourse for a particular radix value will be combined. For example, if a radix value of 16 was used to generate all ciphertext bytes, then the least significant 4 bits will be selected from each ciphertext byte. If a radix value of 8 was used to generate a particular ciphertext byte, then the least significant 3 bits bill be selected from that ciphertext byte.

This combination step is also shown in FIG. 4. Specifically, the least significant 3 bits from ciphertext byte 404(A) and the least significant 4 bits from each of ciphertext bytes 404(B), 404(C), and 404(D) are combined to generate the binary ciphertext value 405. As discussed above, this is because radix 8 was used in the encryption step to generate ciphertext byte 404(A) and radix 16 was used in the encryption step to generate ciphertext bytes 404(B), 404(C), and 404(D).

In this case, the binary ciphertext value 405 of "110 0100 1100 1010" corresponds to a ciphertext decimal value of "25802." As shown in FIGS. 3-4, the disclosed system and method for performing FPE ensures that ciphertext values stay within the universe of discourse of the original plaintext values and do not exceed the memory size allocated to particular data types. The use of an integer with 15 bits in FIG. 4 is exemplary only, and it is understood that the disclosed techniques can be utilized to encrypt in a data type preserving manner for any number of binary values with any number bits.

It is appreciated that the format preserving encryption of a binary numerical value described herein may be implemented in a different manner such as, but not limited to, mapping each bit of the binary numerical value to a different byte and encrypting each byte in in radix 2. Similarly, other divisions of the bits of the binary numerical value into bytes can be used such that format preserving encryption is performed in radix 4, 8 or a mixture of thereof.

Figure 5:
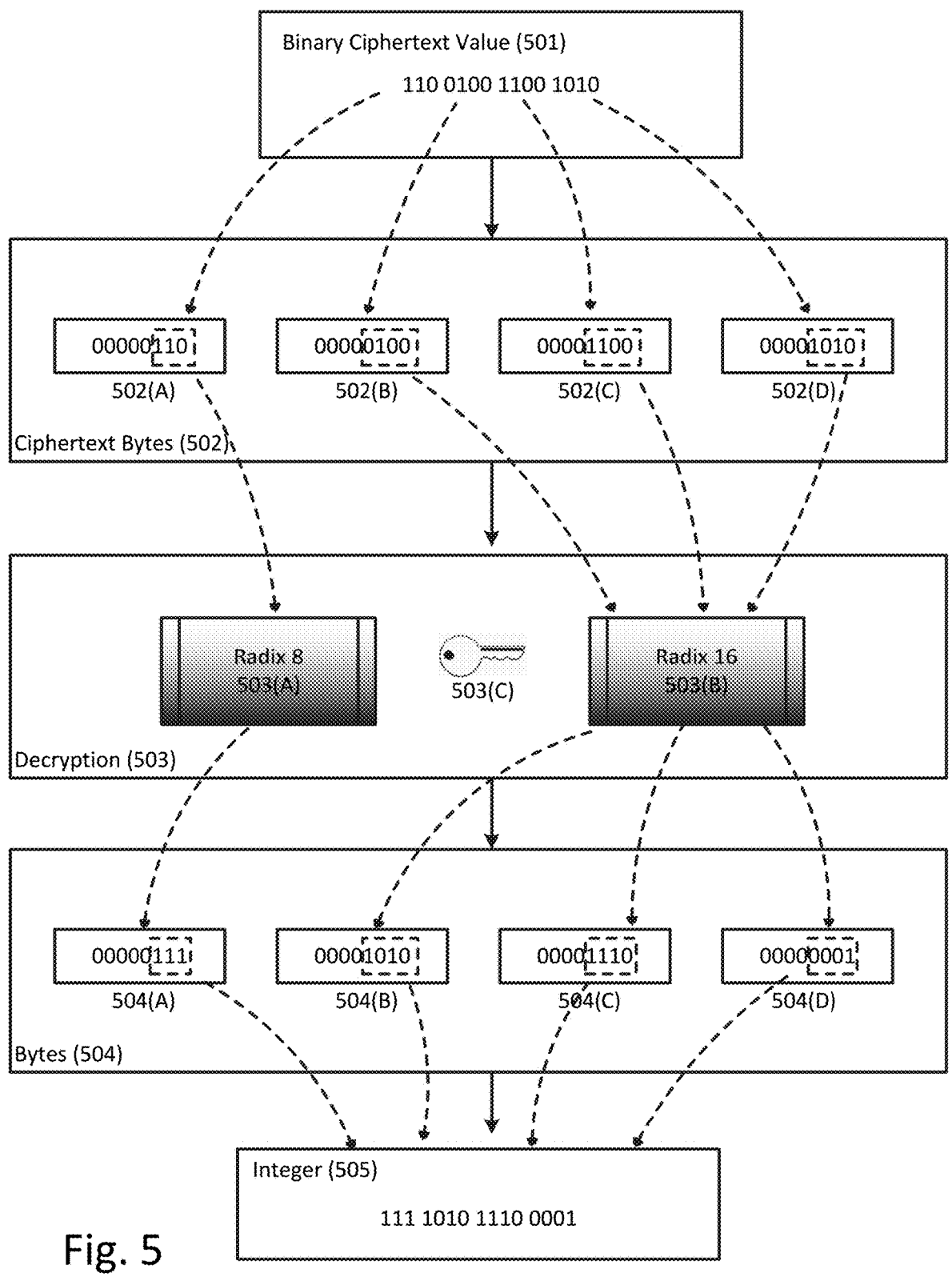
FIG. 5 illustrates an example of a decryption procedure for decrypting ciphertext that is generated using the FPE disclosed herein.

FIG. 5 illustrates an example of a decryption procedure for decrypting ciphertext that is generated using the FPE disclosed herein. As shown in FIG. 5, binary ciphertext value 501 is stored that comprises a plurality of binary ciphertext bits. In this example, the binary ciphertext value has 16 ciphertext bits.

The plurality of binary ciphertext bits are divided into a plurality of ciphertext bit groups and stored in a plurality of ciphertext bytes 502. In the example shown in FIG. 5, ciphertext bit group "0110" is stored in ciphertext byte 502(A), ciphertext bit group "0100" is stored in ciphertext byte 502(B), ciphertext bit group "1100" is stored in ciphertext byte 502(C), and ciphertext bit group "1010" is stored in ciphertext byte 502(D). Similar to the encryption process, each ciphertext bit group is stored at the least significant position of the ciphertext byte and the more significant bits of each ciphertext byte are set to zeroes.

Each byte in the plurality of ciphertext bytes 502 is then decrypted using a radix value corresponding to a quantity of binary ciphertext bits in a ciphertext bit group corresponding to that ciphertext byte, decryption key 503(C), and left and right tweaks (not shown) to generate plaintext bytes 504. For example, since ciphertext byte 502(A) includes only 3 binary ciphertext bits in the corresponding ciphertext bit group ("110"), it is decrypted using radix 8 503(A) to generate plaintext byte 504(A). The remaining ciphertext bytes 502(B), 502(C), and 502(D) all have 4 binary ciphertext bits in their corresponding ciphertext bit groups ("0100," "1100," and "1010" respectively), so they are all decrypted using radix 16 503(B) to generate plaintext bytes 504(B), 504(C), and 504(D).

As shown in FIG. 4, a quantity of least-significant bits from each plaintext byte in the plurality of plaintext bytes 504 are combined to generate a binary plaintext value 505. The quantity of least-significant bits combined from each plaintext byte corresponds to the radix value used to generate that plaintext byte. For example, radix 8 decryption was used to generate plaintext byte 504(A) so the three least significant bits in that plaintext byte are used to generate the binary plaintext value 505. Once again, this ensures that the appropriate decrypted value within the universe of discourse for the numerical value data type is generated during the decryption process.

The disclosed techniques for encrypting bit sequences in a format preserving fashion also enables sign preservation of the resulting ciphertext. Returning to FIG. 3, when the binary numerical value is a signed value (such as a signed integer), then at step 305 the sign bit of the binary numerical value is stored in the leftmost bit of a sign byte. After steps 302-304 are performed, the leftmost bit of the sign byte is then combined with the binary ciphertext value at step 306 to generate a signed binary ciphertext value. This step can be performed, for example, by propagating the sign bit from the leftmost position in the sign byte to the leftmost position in the binary ciphertext value.

Figure 6:
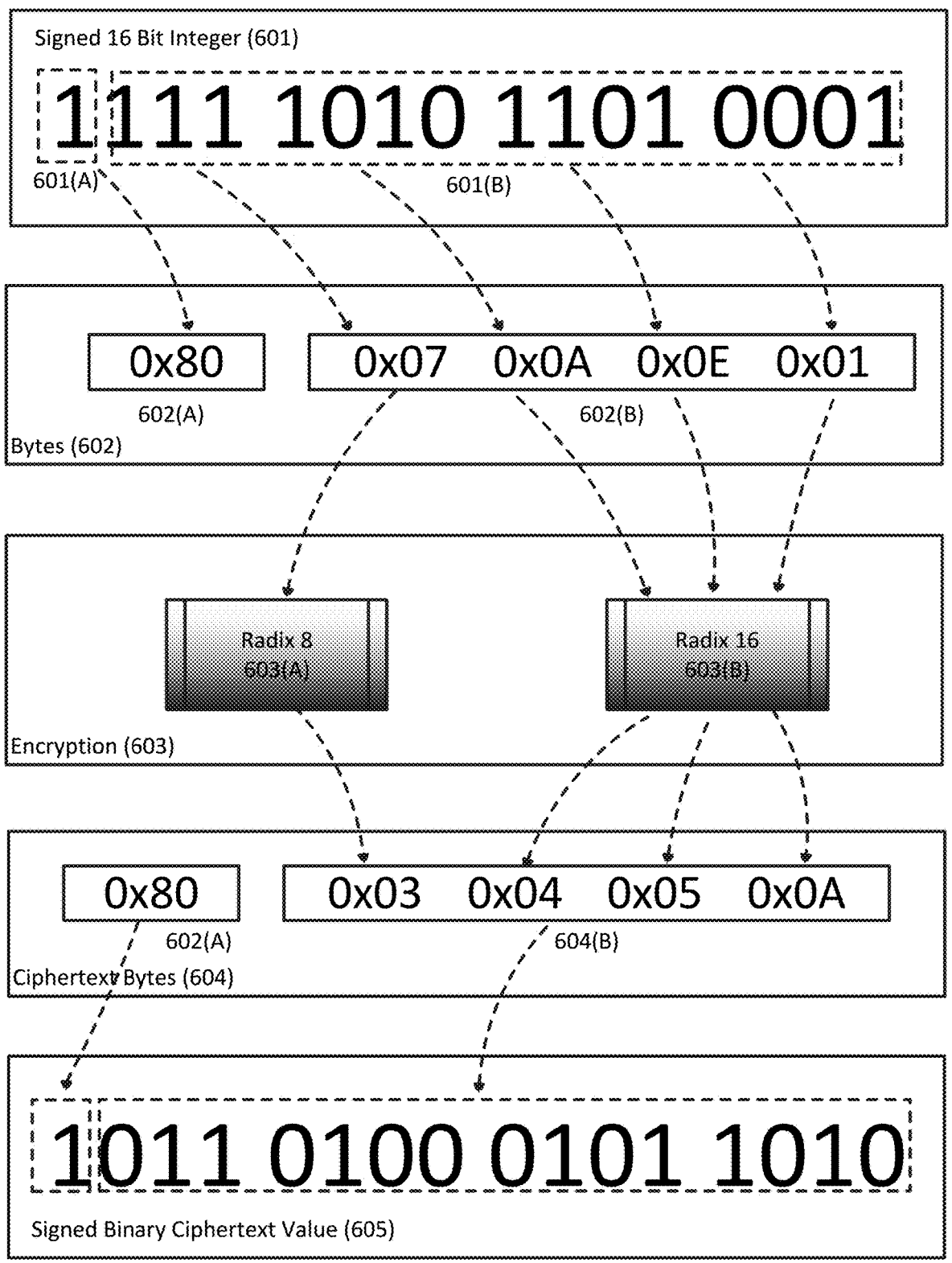
FIG. 6 illustrates an FPE process for encrypting a signed binary numerical value according to an exemplary embodiment.

FIG. 6 illustrates an FPE process for encrypting a signed binary numerical value according to an exemplary embodiment. For illustration purposes and without any limitation e assume that signed binary values follow the two's complement representation and use a 16-bit signed value in the example shown in FIG. 6.

Further referring to FIG. 6, signed 16-bit integer 601 is a signed value in which the leftmost bit 601(A) is the sign bit representing the sign and the remaining bits 601(B) are the plurality of binary bits as discussed above. The sign value is positive when the leftmost bit is set to 0 and negative if the leftmost bit is set to 1. In this example the 16-bit signed integer is the value "1111 1010 1101 0001."

As shown in FIG. 6, to perform format preserving encryption with sign preservation, the plurality of binary bits 601(B) are divided into a plurality of bit groups and stored in bytes 602(B). For ease of reference and clarity, the bits in each byte are represented in the figure in hexadecimal notation. For example, the first byte (0x7) represents the binary value "111" and corresponds to the 3 most significant bits of the plurality of binary bits 601(B). The remaining bytes all correspond to other 4 bit groups within the plurality of binary bits 601(B).

Additionally, the sign bit 601(A) is stored in the leftmost bit of a sign byte 602(A). Again, the bits of the sign byte are shown in hexadecimal notation, but it is understood that the hexadecimal value "0x80" corresponds to the binary value "1000 0000." Together, the sign byte 602(A) and the plurality of bytes 602(B) form all of the bytes 602 used to store values extracted from the signed numerical value 601.

Each of the plurality of bytes 602(B) are then encrypted 603 as discussed with reference to previous figures, with byte 0x07 being encrypted using radix 8 603(A) encryption and the remaining bytes being encrypted using radix 16 603(B) encryption. This results in a plurality of ciphertext bytes 604 including bytes 604(B) and the sign byte 602(A) which is not encrypted and is unchanged. The storage of the sign bit in the left-most half-byte of each of the bytes 602 can be used to signal to the encryption process 603 not to perform encryption on the sign byte.

As shown in FIG. 6, a quantity of least-significant bits is combined from each of the ciphertext bytes 604(B) to generate a binary ciphertext value. As discussed previously, the quantity of least-significant bits combined from each ciphertext byte corresponds to the radix value used to generate that ciphertext byte.

Additionally, the leftmost (most significant) bit of the sign byte is combined with the binary ciphertext value to generate signed binary ciphertext value 605. In particular, the leftmost bit of the sign byte is appended onto the binary ciphertext value to generate the signed binary ciphertext value 605.

As discussed earlier, the FPE process described herein can be applied to any data type and preservers the data type of the binary numerical value to which it is applied. The binary numerical value can be, for example, a floating point value including a sign bit and a plurality of binary bits and in which the plurality of binary bits include a plurality of exponent bits and a plurality of mantissa bits.

FIG. 7 illustrates Institute of Electrical and Electronics Engineers (IEEE) 754 standard floating point numbers. A number in IEEE 754 single-precision 32-bit floating point format 700 consists of 23 bits representing the mantissa 704, 8 bits representing the exponent 703 and one sign bit 702. A special combination of exponent 703 bits, "1111 1111", identifies a floating-point object NaN ("not a number"). An infinite floating-point value is represented by setting all mantissa 704 bits to 0.

Further referring to FIG. 7, a number in IEEE 754 double-precision 64-bit floating point format 701 consists of 52 bits representing the mantissa 707, 11 bits representing the exponent 706 and one sign bit 705. A special combination of exponent 706 bits, "111 1111 1111", identifies a floating-point object NaN ("not a number"). An infinite floating-point value is represented by setting all mantissa 707 bits to 0.

Figure 8:
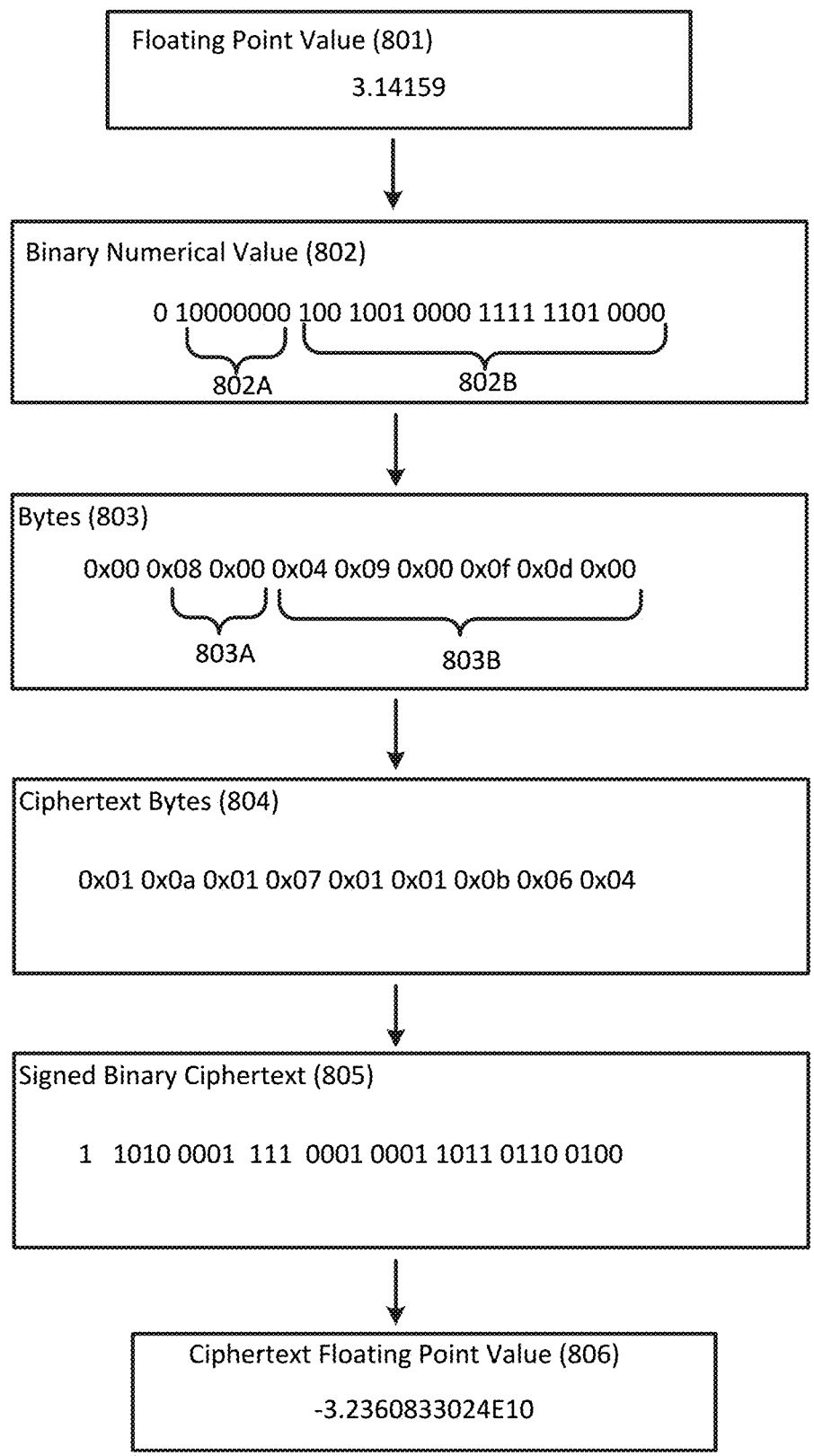
FIG. 8 illustrates format preserving encryption of a single precision floating point value according to an exemplary embodiment.

FIG. 8 illustrates format preserving encryption of a single precision floating point value according to an exemplary embodiment. The floating point value is shown in decimal plaintext 801 ("3.14159") and the corresponding binary numerical value 802. If the floating point value is stored or read in decimal notation then it can be converted into binary notation. The binary numerical value a sign bit (the first bit), 8 bits of the exponent 802A and 23 bits of the mantissa 802B.

The binary numerical value 802 is converted into a plurality of bytes 803 using the processes described above. In this case, the bytes 803 include a sign byte (the first byte), two bytes 803A corresponding to the eight-bit exponent 802A, and six bytes 803B corresponding to the 23 bit mantissa 802B. Of the mantissa bytes 803B, the leftmost 3 bits of the mantissa 802B are stored in the leftmost byte and each of the remaining 20 bits of the mantissa 802B are stored in five groups of four bits each.

Further referring to FIG. 8, the encryption step transforms the plurality of bytes 803 into a plurality of ciphertext bytes 804 by encrypting each byte in the plurality of bytes 803, using the encryption process described with reference to the previous figures and explained in greater detail below.

The leftmost byte ("0x00") in the plurality of bytes 803 corresponds to the sign byte and is encrypted in radix 2. Of course, if sign preservation is desired, then the sign bit can be stored in the most significant (leftmost) position in the sign byte and the encryption step can be omitted for the sign byte. The following two bytes 803A ("0x08 0x01") in the plurality of bytes 803 are encrypted in radix 16. The next byte ("0x04") is encrypted in radix 8 because it only corresponds to 3 bits of the mantissa. The remaining five mantissa bytes ("0x09 0x00 0x0f 0x0d 0x00") and are encrypted in radix 16.

Further referring to FIG. 8, a quantity of least significant bits from the ciphertext bytes 804 are then combined to generate a signed binary ciphertext 805. The signed binary ciphertext 805 includes the rightmost bit of the ciphertext sign byte ("0x1"), the rightmost half-bytes of the following two cipher text bytes ("0xa, 0x1"), the three rightmost bits ("0x7") of the next ciphertext byte and the rightmost half-bytes of the remaining five bytes ("0x1 0x1 0xb 0x6 0x4"). As shown in FIG. 8, the signed binary ciphertext 805 corresponding to a ciphertext floating point value 806 can be represented or converted into decimal format 806 ("−3.2360833024E10").

Figure 9:
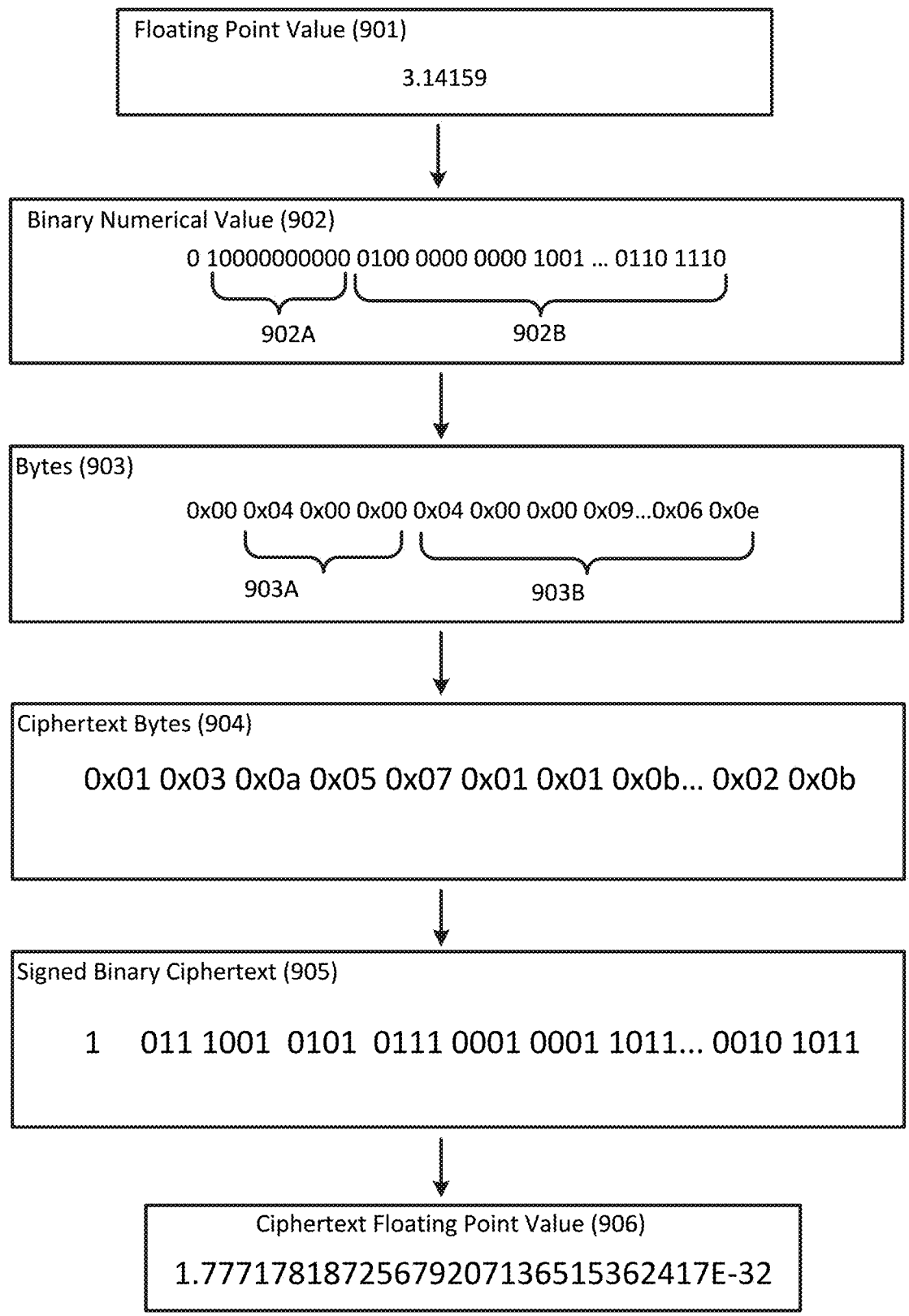
FIG. 9 illustrates format preserving encryption of a double precision floating point data value according to an exemplary embodiment.

FIG. 9 illustrates format preserving encryption of a double precision floating point data value according to an exemplary embodiment. The process shown in FIG. 9 is similar to that shown in FIG. 8 and in the preceding figures and description. The floating point value is shown in decimal notation 901. If the floating point value is stored or read in decimal notation then it can be converted into binary notation. The corresponding binary numerical value 902 includes bits corresponding to the sign (leftmost bit), the exponent 902A, and the mantissa 902B. These bits are then divided into bit groups and places into bytes 903, including bytes corresponding to the sign (leftmost byte), bytes corresponding to the exponent 903A, and bytes corresponding to the mantissa 903B. In this case, the sign byte corresponds to a single sign bit, the leftmost exponent byte ("0x04") corresponds to the three leftmost bits of exponent 902A and the remaining bytes all correspond to 4 bits. The bytes 903 are then encrypted to generate ciphertext bytes 904. A quantity of bits from each binary ciphertext byte (corresponding to the radix value used for encryption) are then combined to generate binary ciphertext byte 905, corresponding to the ciphertext floating point value shown in decimal notation 906.

The decryption process for decrypting a floating point value is a reverse process that that shown in FIGS. 8-9, in which a ciphertext floating point value is the input and the output is a plaintext floating point value. The decryption process will follow the reverse order of steps shown in FIGS. 8-9.

Another type of binary numerical value that can be encrypted using the FPE described herein is a numerical timestamp. The numerical timestamp can be represented by, for example, UNIX time. UNIX time is a 32-bit or a 64-bit signed binary value representing time elapsed since 00:00:00 Coordinated Universal Time (UTC) of Jan. 1, 1970.

Figure 10:
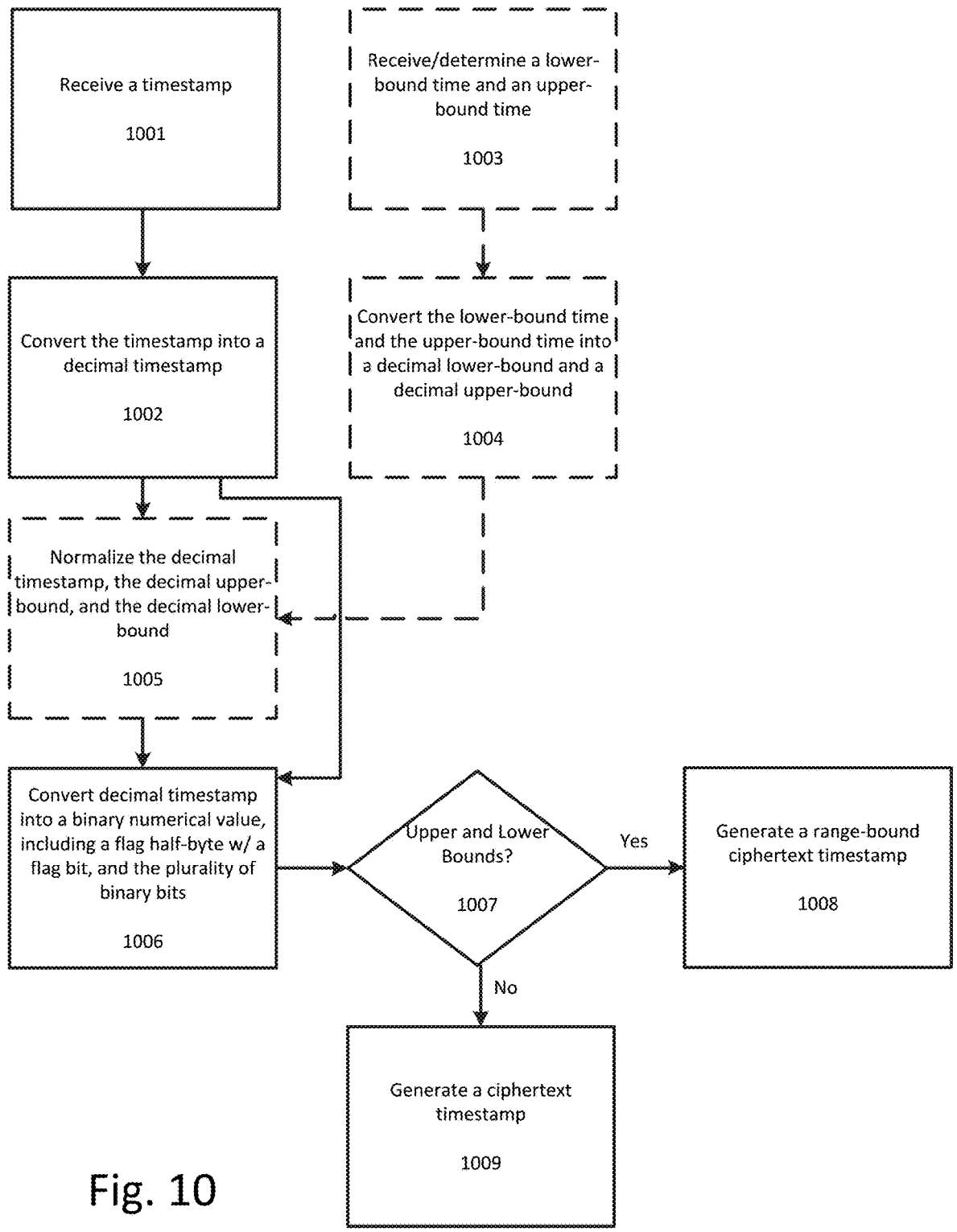
FIG. 10 illustrates a flowchart for generating a timestamp binary ciphertext value according to an exemplary embodiment.

FIG. 10 illustrates a flowchart for generating a timestamp binary ciphertext value according to an exemplary embodiment. As will be discussed below, the steps shown in FIG. 10 cover the scenario where the timestamp is encrypted without any bounds (steps 1001-1002, 1006-1007, and 1009) and the scenario where the timestamp is encrypted subject to upper and/or lower bounds (steps 1001-1009). Each of these scenarios are discussed separately below.

At step 1001 a timestamp is received. The timestamp can be received from an executing process and/or as part of a request. For example, the timestamp can be passed in as an argument in a function call (such as an encryption request). The timestamp can also be stored in a database and passed to an encryption as an argument by reference, meaning a memory location of the stored timestamp is passed to the function. The timestamp can also be read from a portion of the memory storing the current system time.

At step 1002 the timestamp is converted into a decimal timestamp. If the UNIX time convention is used, this can be performed by computing the number of seconds elapsed since the Coordinated Universal Time (UTC) of Jan. 1, 1970 based on the timestamp.

At step 1006 the decimal timestamp can then be converted into a binary numerical value including a flag half-byte with a flag bit and a plurality of binary bits. This can be performed by changing from decimal notation to binary notation. As will be illustrated in the following figures, for UNIX time, the flag bit is a leftmost non-zero bit to the right of the sign bit of the UNIX time value.

At step 1007 a determination can be made regarding whether upper and lower bounds have been received or determined. Optionally, this step can be omitted and separate process flows can be implemented for a timestamp having upper and lower bounds and timestamp without bounds.

Figure 11:
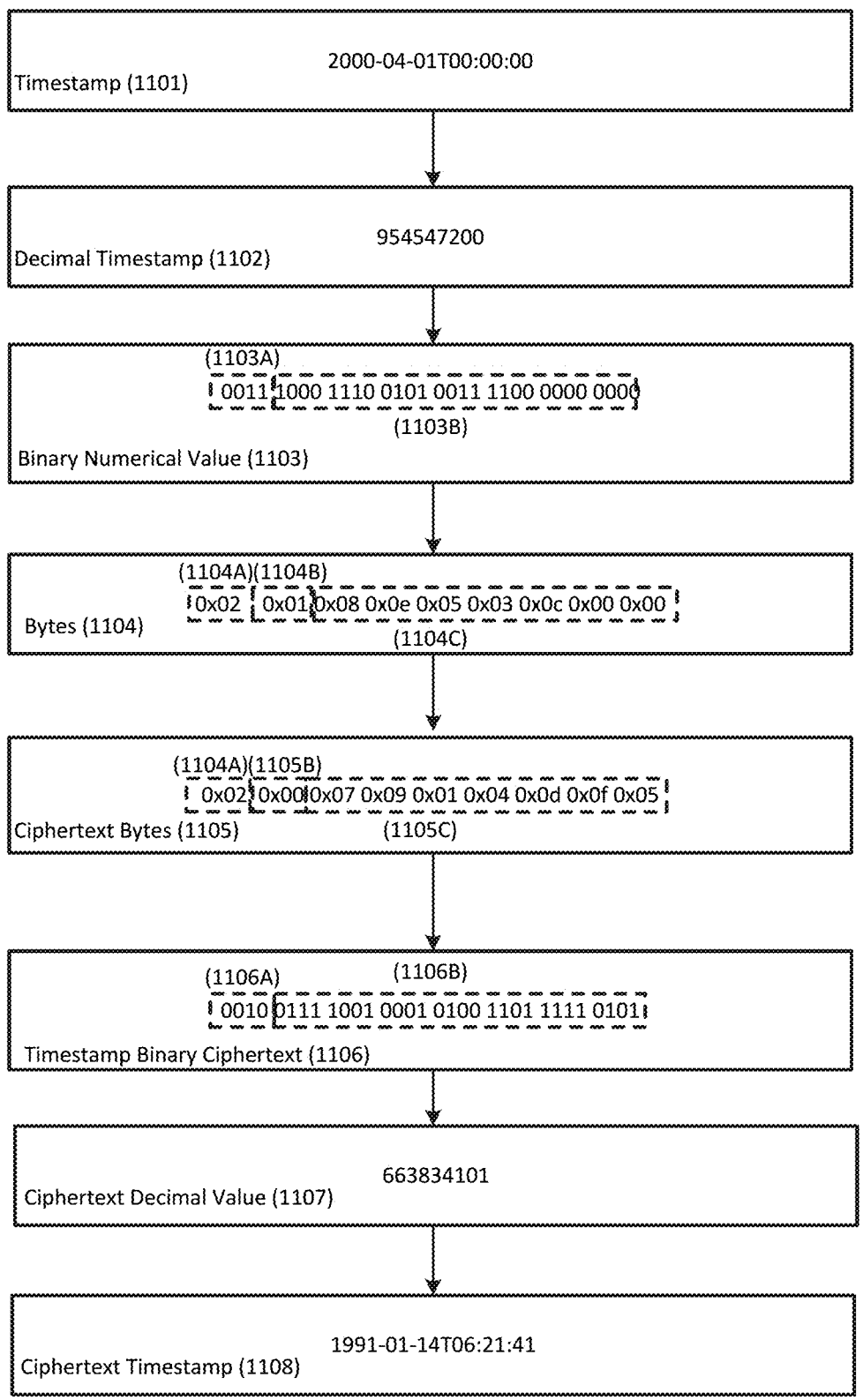
FIG. 11 illustrates the process of generating a timestamp binary ciphertext value from an unbounded timestamp according to an exemplary embodiment.

When there are no upper and lower bounds, at step 1009 a ciphertext timestamp value is generated. This step is performed by first storing the flag bit in a flag byte and storing any remaining bits less significant than the flag bit within the flag half-byte in a remainder byte. The remainder byte is then encrypted using a radix value corresponding to a quantity of remaining bits within the remainder byte to generate a ciphertext remainder byte. A binary OR operation is then applied to the flag byte and the ciphertext remainder byte to generate a result flag half-byte. The result flag half-byte is then combined with the binary ciphertext value generated from the plurality of binary bits (using the techniques described in FIGS. 3-4) to generate a timestamp binary ciphertext value. This timestamp binary ciphertext value is then converted into a ciphertext decimal value and subsequently into a ciphertext timestamp FIG. 11 illustrates the process of generating a timestamp binary ciphertext value from an unbounded timestamp according to an exemplary embodiment. Timestamp 1101 is converted into decimal timestamp 1102. This is performed by converting the timestamp into a total number of seconds elapsed since UTC. This can include, for example, determining the total number of days between the date indicated by the timestamp (Apr. 1, 2000) and UTC (Jan. 1, 1970), multiplying that value by 24 hours in a day, multiplying that value by 60 minutes in an hour, and multiplying that value by 60 seconds in a minute.

The decimal timestamp 1102 is then converted into binary numerical value 1103. The binary numerical value 1103 includes a flag half-byte 1103A ("0011") which includes both the sign bit and the flag bit. The sign bit is the leftmost bit value ("0") and the flag bit is the leftmost non-zero bit to the right of the sign bit of the UNIX time value (the first "1"

in the flag half byte 1103A). The binary numerical value 1103 also includes a plurality of binary bits 1103B after the flag half-byte.

The binary numerical value 1103 is then separated into bytes 1104. The flag bit ("1") is stored in flag byte 1104A. Applicant notes that flag byte 1104 has the value 0x02 because the flag bit "1" is located at the 2's position within flag half-byte 1103A. The only remaining bit within flag half-byte 1103A after the flag bit is therefore another "1" bit. This remaining "1" bit is stored in a remainder byte 1004B. Remainder byte 1004 has the value 0x01 because the remaining bit is located at the 1's position within flag half-byte. The plurality of binary bits 1103B are stored in bytes 1104C as described with respect to FIGS. 3-4.

All of the bytes 1104 other than the flag byte 1104A are then encrypted to generate ciphertext bytes 1105. Bytes 1104C corresponding to the plurality of binary bits 1103B are encrypted using the techniques described with respect to FIGS. 3-4 to generate ciphertext bytes 1105C.

The remainder byte 1104B is encrypted using a radix value corresponding to a quantity of remaining bits within the remainder byte to generate a ciphertext remainder byte 1105B. In this case, there was only one "remaining bit" added to the remainder byte 1104B, so it is encrypted with radix 2 to generate ciphertext remainder byte 1105B.

Timestamp binary ciphertext 1106 is generated by first combining a quantity of least significant bits from ciphertext bytes 1105C (the bytes after the flag byte 1104A and the remainder byte 1105B) in the manner described with respect to FIGS. 3-4 (where the quantity for each byte is based upon the radix value used to generate that ciphertext byte) to generate the binary ciphertext value 1106B.

A binary OR operation is then applied to the flag byte 1104A and the ciphertext remainder byte 1105B to generate a result flag half-byte 1106A. The result flag half-byte 1106A is then combined with the binary ciphertext value 1106B to generate the timestamp binary ciphertext value 1106.

The timestamp binary ciphertext 1106 can then be converted back into a ciphertext decimal value 1107 and then into a ciphertext timestamp 1108 using the conversion process described above.

The decryption process for decrypting a timestamp is a reverse process that that shown in FIGS. 10-11, in which a ciphertext timestamp is the input and the output is a plaintext timestamp. The decryption process will follow the reverse order of steps shown in FIGS. 10-11.

In certain use cases it is important that the encrypted timestamp value is bound within a certain interval, for example encrypting a UNIX time value in a format preserving fashion that guarantees encrypted value to be bound in a certain range $t_{start} < t < t_{end}$. There are many scenarios when such bounds are necessary. For example, if a UNIX time value represents a date of birth an encrypted UNIX time value containing time in a future may break an existing application which performs a sanity check on the input data. In another example, consider an exemplary time Nov. 17, 1982 at midnight which should be encrypted in a range between the midnight of Apr. 1, 1980 and the midnight of Apr. 1, 2000.

Referring to FIG. 10, steps 1001-1009 cover the scenario in which a lower-bound and/or upper bound time are utilized when encrypting a timestamp. Steps 1001-1002 are the same regardless of whether an upper and lower bound are received or if there are no bounds.

At step 1003 a lower-bound time and an upper-bound time are received or determined. The lower-bound time and upper-bound time can be received as part of a function call or other process or determined automatically. For example, the upper-bound and lower-bound can be determined based upon contextual information or metadata (such as what specific value the timestamp is measuring).

At step 1004 the lower-bound time and the upper-bound time are also converted into a decimal lower-bound and a decimal upper-bound. This step can be similar to the conversion process of step 1002 when the lower-bound and the upper-bound timestamps use the same format.

At step 1005 the decimal timestamp, the decimal upper-bound, and the decimal lower-bound prior are normalized prior to converting the decimal timestamp into the binary numerical value in step 1006. This normalization process sets the decimal lower-bound equal to a value of zero and adjusts the decimal timestamp and the decimal upper-bound to maintain the same value relative to the normalized decimal lower-bound. For example, if the decimal upper bound was 130, the decimal timestamp was 56, and the decimal lower-bound was 32, then the normalized decimal lower-bound be set to zero, the normalized decimal timestamp would 24, and the normalized decimal upper-bound would be 98.

Figure 12:
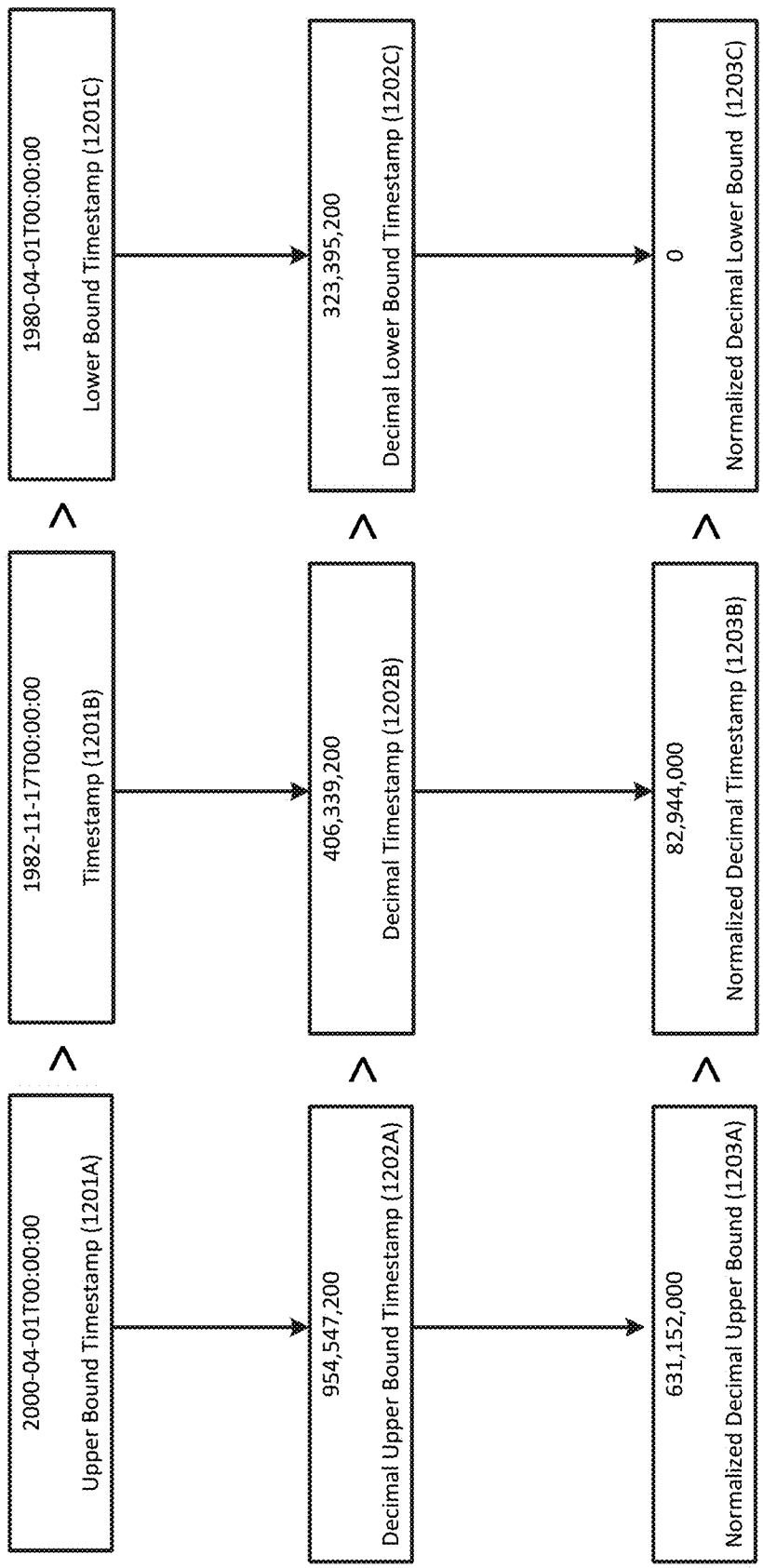
FIG. 12 illustrates the decimal conversion and normalization process for a timestamp having a lower and upper bound according to an exemplary embodiment.

FIG. 12 illustrates the decimal conversion and normalization process for a timestamp having a lower and upper bound according to an exemplary embodiment. As shown in FIG. 12, an upper-bound timestamp 1201A, a timestamp 1201B, and a lower-bound timestamp 1201C are all received. These are then converted to decimal upper-bound timestamp 1202A, decimal timestamp 1202B, and decimal lower-bound timestamp 1202C. Decimal lower-bound timestamp 1202C is converted to a normalized decimal lower-bound 1203C by setting it to zero. Decimal upper-bound timestamp 1202A, decimal timestamp 1202B are converted to normalized decimal upper-bound 1203A and normalized decimal timestamp 1203B, respectively, by subtracting the value of the decimal lower-bound timestamp 1202C.

Returning to FIG. 10, at step 1006 the decimal timestamp is converted into the binary numerical value, which includes a flag half-byte comprising a flag bit and a plurality of binary bits. The implementation of step 1006 will differ depending on whether the timestamp has an associated upper and lower bound or is unbounded. In the case of a normalized decimal timestamp with a normalized upper-bound, the normalized decimal upper-bound and the normalized decimal timestamp are first converted into a binary upper-bound and a binary timestamp.

The binary upper-bound and the binary timestamp are then compared to identify an initial instance of a half-byte in the binary timestamp that differs from a corresponding half-byte in the binary upper-bound. A leftmost bit is then identified within the identified half-byte of the binary timestamp that has a value of 0 where a corresponding bit in the corresponding half-byte in the binary upper-bound has a value of 1. For example, if the identified half-byte in the binary timestamp is "1011" and the corresponding half-byte in the binary upper-bound is "0101," then the identified bit would be the second bit of the identified half-byte of the binary timestamp.

This identified bit is then designated as the flag bit, the identified half-byte is designated as the flag half-byte, and remaining bits in the binary timestamp are designated as the plurality of binary bits. The flag bit indicates a position in the binary timestamp that serves as a procedural boundary. The bits following this procedural boundary are subject to encryption.

Figure 13:
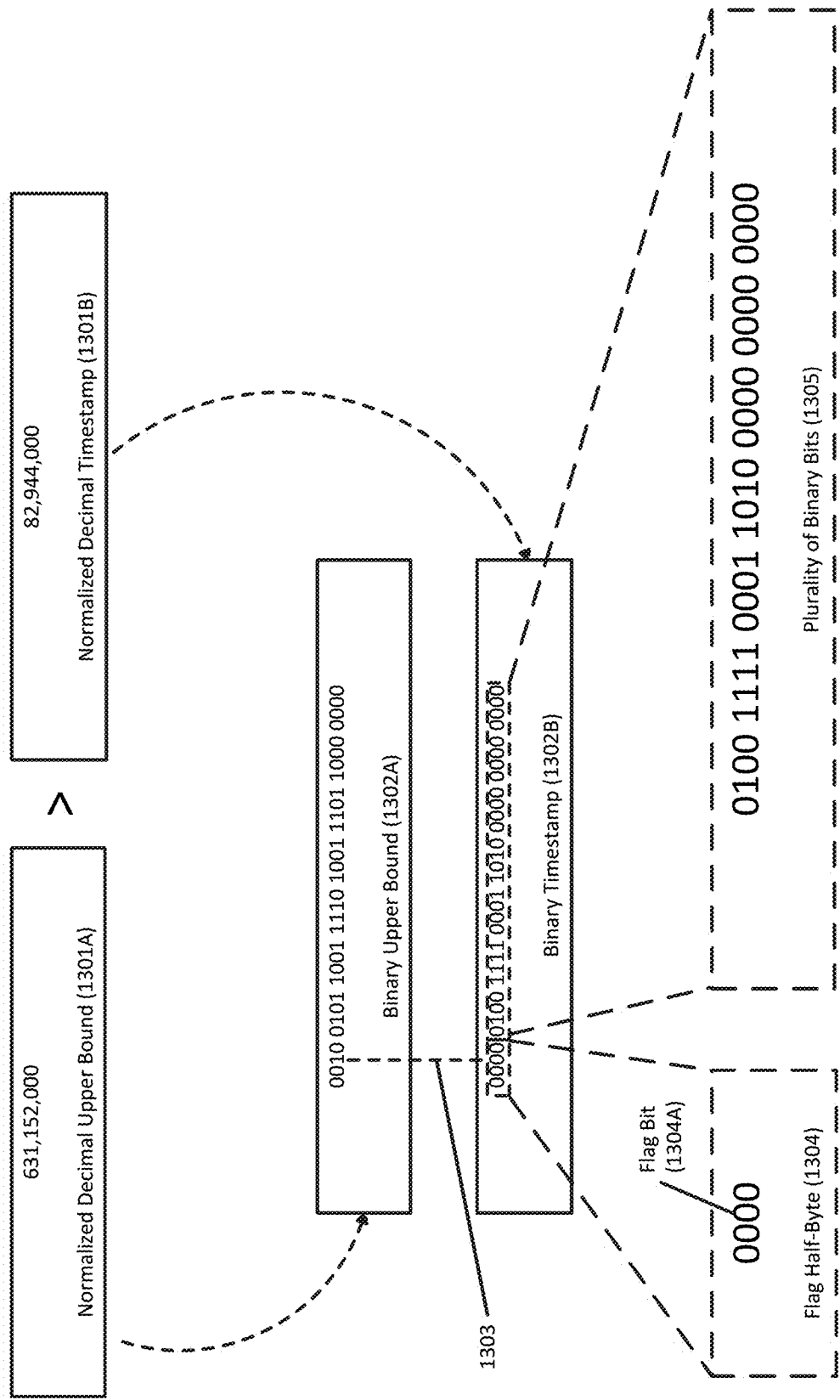
FIG. 13 illustrates the process for converting a normalized decimal timestamp into the binary numerical value according to an exemplary embodiment.

FIG. 13 illustrates the process for converting a normalized decimal timestamp into the binary numerical value according to an exemplary embodiment. As shown in FIG. 13, binary upper bound 1302A corresponds to normalized decimal upper-bound 1301A and binary timestamp 1302B corresponds to normalized decimal timestamp 1301B.

The binary upper-bound 1302A and the binary timestamp 1302B are then compared to identify an initial instance of a half-byte in the binary timestamp 1302B that differs from the binary upper-bound 1302A. This half-byte is designated as the flag half-byte 1304. Additionally, the flag half-byte 1304 is analyzed to identify a leftmost bit that has a value of 0 where a corresponding bit in the binary upper-bound is 1. Dashed line 1303 shows the result of this comparison, identifying the third bit in flag half-byte 1304. This bit is designated as the flag bit 1304A. Additionally, the remaining bits in binary timestamp after the flag half-byte are designated the plurality of binary bits 1305.

At step 1007 a determination can be made regarding whether upper and lower bounds have been received or determined. Optionally, this step can be omitted and separate process flows can be implemented for a timestamp having upper and lower bounds and timestamp without bounds.

When upper and lower bounds have been received or determined, then at step 1008 a range-bound ciphertext timestamp is generated. This step first stores any remaining bits less significant than the flag bit within the flag half-byte in a remainder byte. For example, if the flag half-byte is "1011" and the flag bit is the 0, then the remaining bits to the right of the 0 ("11") would be stored in a remainder byte.

The remainder byte is then encrypted using a radix value corresponding to a quantity of remaining bits within the remainder byte to generate a ciphertext remainder byte. In the above example, two remaining bits are stored in the remainder byte so the remainder byte would be encrypted with radix 4.

A quantity of least-significant bits in the ciphertext remainder byte corresponding to the radix value used to generate the ciphertext remainder byte are then combined with the binary ciphertext value generated from the plurality of binary bits (using the techniques described in FIGS. 3-4) to generate a timestamp binary ciphertext value.

The timestamp binary ciphertext value is then converted into a timestamp ciphertext decimal value by converting between base-10 (decimal) to base-2(binary).

A range-bound timestamp ciphertext decimal value is then generated by subtracting the ciphertext decimal value from the decimal upper-bound.

The range-bound timestamp ciphertext decimal value is then converted into a rangebound ciphertext timestamp using the processes described previously for converting between decimal values and timestamps (as measured in units of time, such as seconds for UNIX time).

Figure 14:
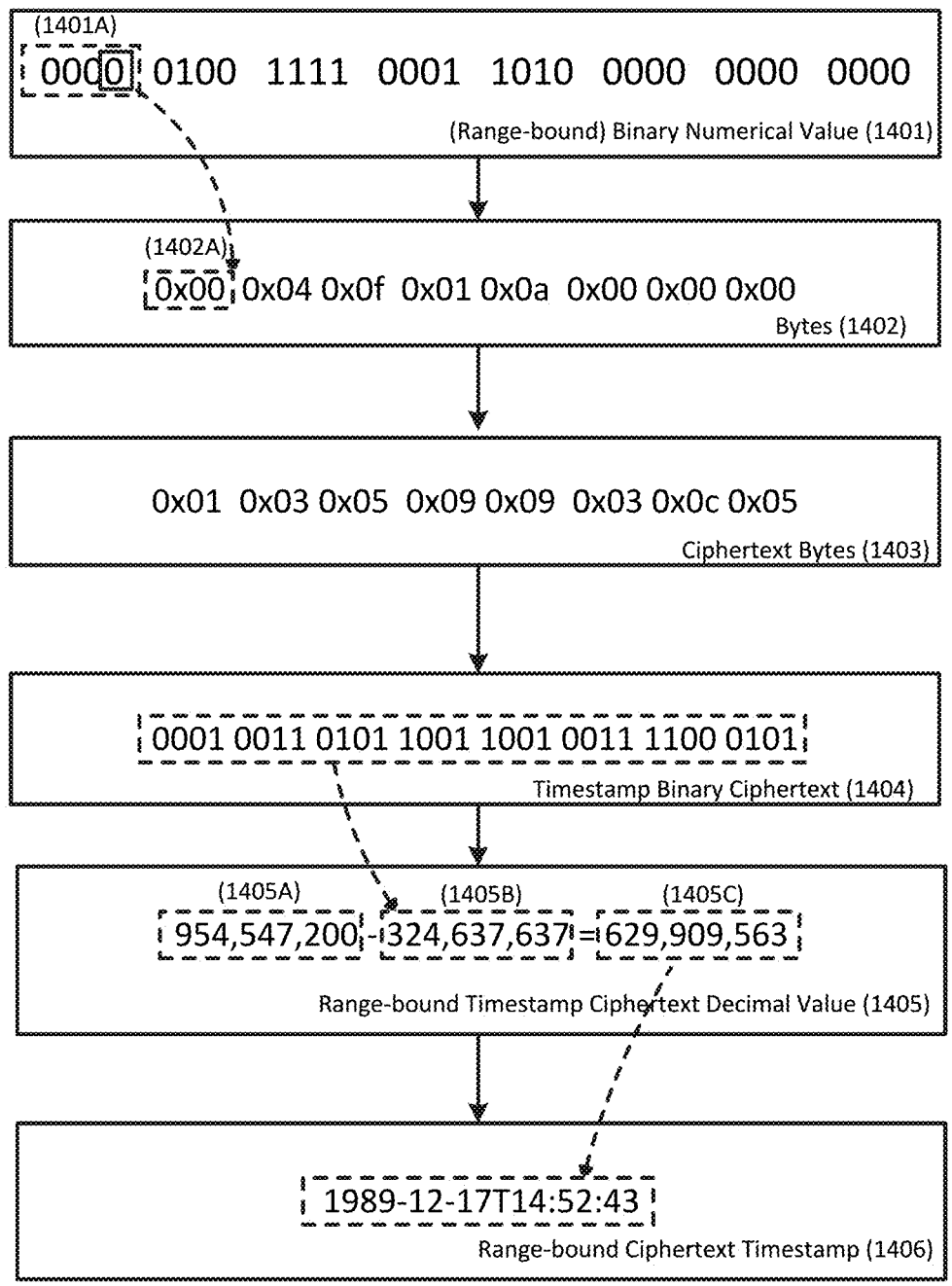
FIG. 14 illustrates the process of generating a rangebound ciphertext timestamp for a timestamp having an upper and lower bound according to an exemplary embodiment.

FIG. 14 illustrates the process of generating a rangebound ciphertext timestamp for a timestamp having an upper and lower bound according to an exemplary embodiment. The original timestamp, upper-bound, and lower-bound are based the examples shown in FIGS. 12-13.

Binary numerical value 1401 is the binary representation of a normalized decimal timestamp, which itself is generated from the timestamp, the lower-bound time, and the upper-bound time as discussed above. The binary numerical value 1401 includes a flag half-byte 1401A, in which the flag bit is the third bit from the left and the remainder bit is the last bit in the half-byte 1401A.

The binary numerical value 1401 is divided into bytes 1402 using the processes described above, with the remainder bit being stored in its own remainder byte 1402A. These bytes are then encrypted using the appropriate radix values to generate ciphertext bytes 1403.

A quantity of bits from each ciphertext byte (the quantity corresponding to the radix value used during encryption) are then combined to generate timestamp binary ciphertext 1404.

The timestamp binary ciphertext 1404 is then converted into a ciphertext decimal value 1405B and substracted from decimal upper-bound 1405A to generate the range-bound timestamp ciphertext decimal value 1405C.

The range-bound timestamp ciphertext decimal value 1405C is then converted into a rangebound ciphertext timestamp 1406 based upon the UTC and a conversion from seconds into a specific date.

Decryption of the encrypted bounded timestamp is a reverse process to that illustrated in FIGS. 10-14 that takes a rangebound ciphertext timestamp as input and outputs a rangebound plaintext timestamp. During decryption the range-bound timestamp ciphertext decimal value is normalized and then subtracted from the decimal upper-bound value. In a next step a flag bit is discovered, a timestamp binary ciphertext value is constructed, divided into ciphertext bytes, and these are then decrypted. The plaintext of the rangebound ciphertext timestamp is recovered by subtracting the decrypted decimal plaintext timestamp from the decimal upper-bound value.

With respect to FIGS. 10-14, it is appreciated that the sign bit of UNIX time values can also be encrypted in a format preserving manner using radix 2 and the result of encryption can be merged back into binary ciphertext, as discussed with respect to FIG. 6.

Additionally, it is appreciated that the method of encrypting UNIX time values disclosed herein may be applied to encrypting in a format preserving manner other time counters such as milliseconds counters, microseconds counters, etc.

Another type of numeric data object commonly present in databases is the DECIMAL (p, s) data type which is also called NUMERIC (p, s). Objects of this data type are defined as an exact numerical with precision "p" and scale "s." DECIMAL values are stored in a fixed number of bytes. The size of storage is derived from the precision parameter of the DECIMAL data object. Fixed size of storage for DECIMAL values implies that format preserving encryption of the DECIMAL data objects requires preservation of the precision and scale parameters of the plaintext in the ciphertext. Optionally, sign of the plaintext value may be preserved as well.

Figure 15:
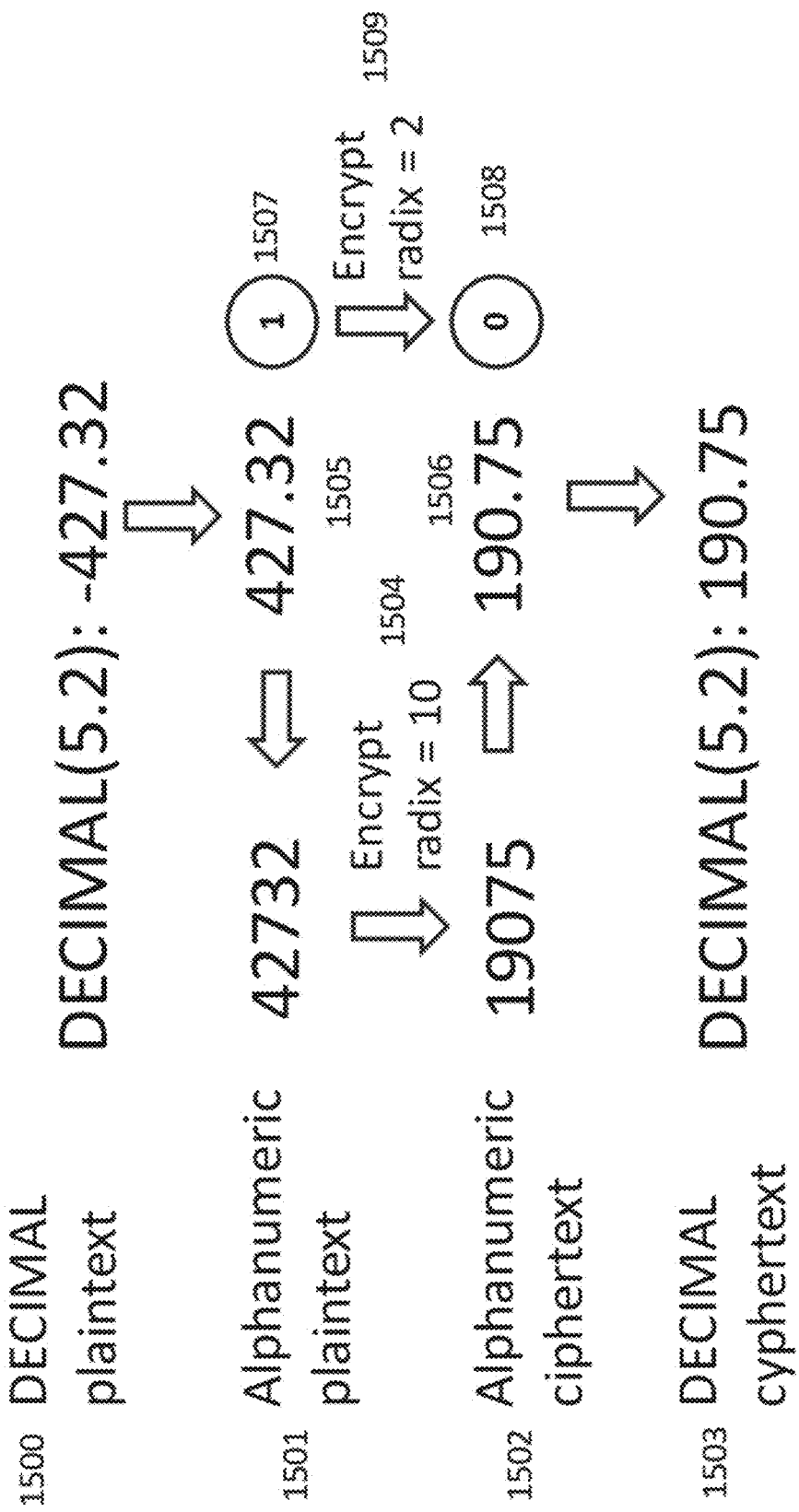
FIG. 15 illustrates a method for encrypting DECIMAL data objects in a format and data type preserving manner according to an exemplary embodiment.

FIG. 15 illustrates a method for encrypting DECIMAL data objects in a format and data type preserving manner according to an exemplary embodiment. In a first step decimal plaintext 1500 representing DECIMAL (5.2) value "−427.31" is extracted as an alphanumeric value "427.31" 1505 and a sign artifact 1507 which takes value 0 if the DECIMAL is positive and takes value 1 when the DECIMAL is negative. In the next step alphanumeric value is transformed into alphanumeric plaintext 1501 "42731" by removing the decimal dot (".") in alphanumeric value 1505.

In the next step alphanumeric plaintext 1501 "42731" is encrypted in a format preserving manner using radix 10 1504 and sign artifact 1507 is also encrypted in format preserving manner using radix 2 1509. This step produces alphanumeric ciphertext 1502 "19075" and encrypted sign artifact 1508.

In the following step a decimal dot (".") character is introduced in a place specified by the DECIMAL data object format forming encrypted alphanumeric value 1506. In case if the encrypted sign artifact 1508 is 1 then encrypted alphanumeric value 1506 is multiplied by −1 making it a negative number. In case if the encrypted sign artifact 1508 is 0 no further transformation is applied to the encrypted alphanumeric value 1506. In the final step alphanumeric value 1506 is placed in the DECIMAL data object thus creating DECIMAL ciphertext 1503.

Format preserving decryption of a DECIMAL data object is performed in the reverse order as that shown in FIG. 15.

Another type of data object is the Boolean data object. A Boolean data object takes only two values: TRUE and FALSE. As a convention the Boolean value TRUE is associated with a numeric value "1" and Boolean value FALSE with a numeric value "0."

Figure 16:
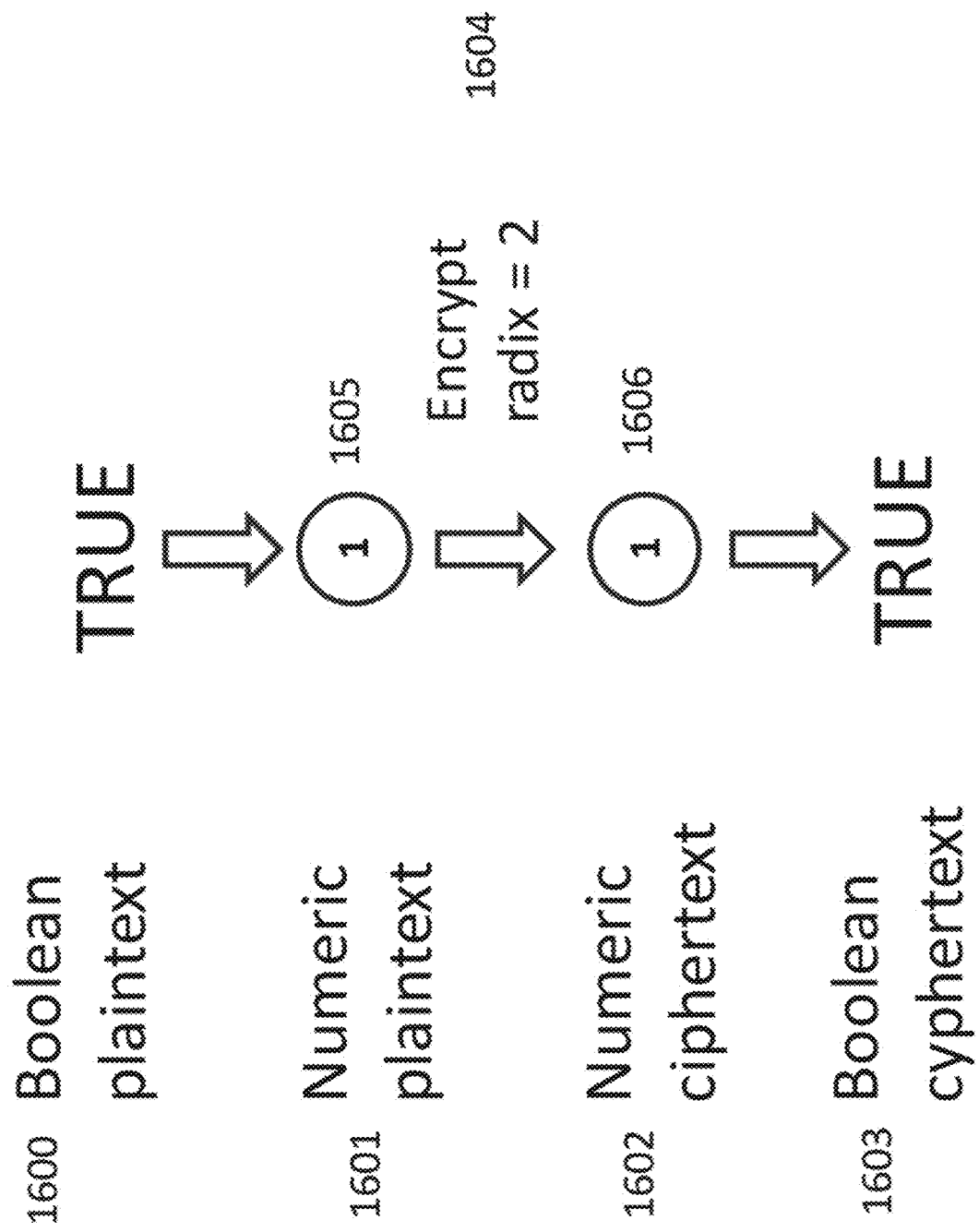
FIG. 16 illustrates format and data type preserving encryption of a Boolean data object according to an exemplary embodiment.

FIG. 16 illustrates format and data type preserving encryption of a Boolean data object according to an exemplary embodiment. In a first step Boolean plaintext value 1600 representing Boolean value TRUE is translated into numeric plaintext value 1601 "1" 1605. In a subsequent step numeric plaintext value 1601 "1" is encrypted in a format preserving fashion using radix 2 1604 which results in a numeric ciphertext value 1606 "1." In the final step of computation numeric ciphertext value 1606 "1" is translated into a Boolean ciphertext value 1606 TRUE.

The decryption process of a Boolean data object is the reverse of the encryption process shown in FIG. 16.

Figure 17:
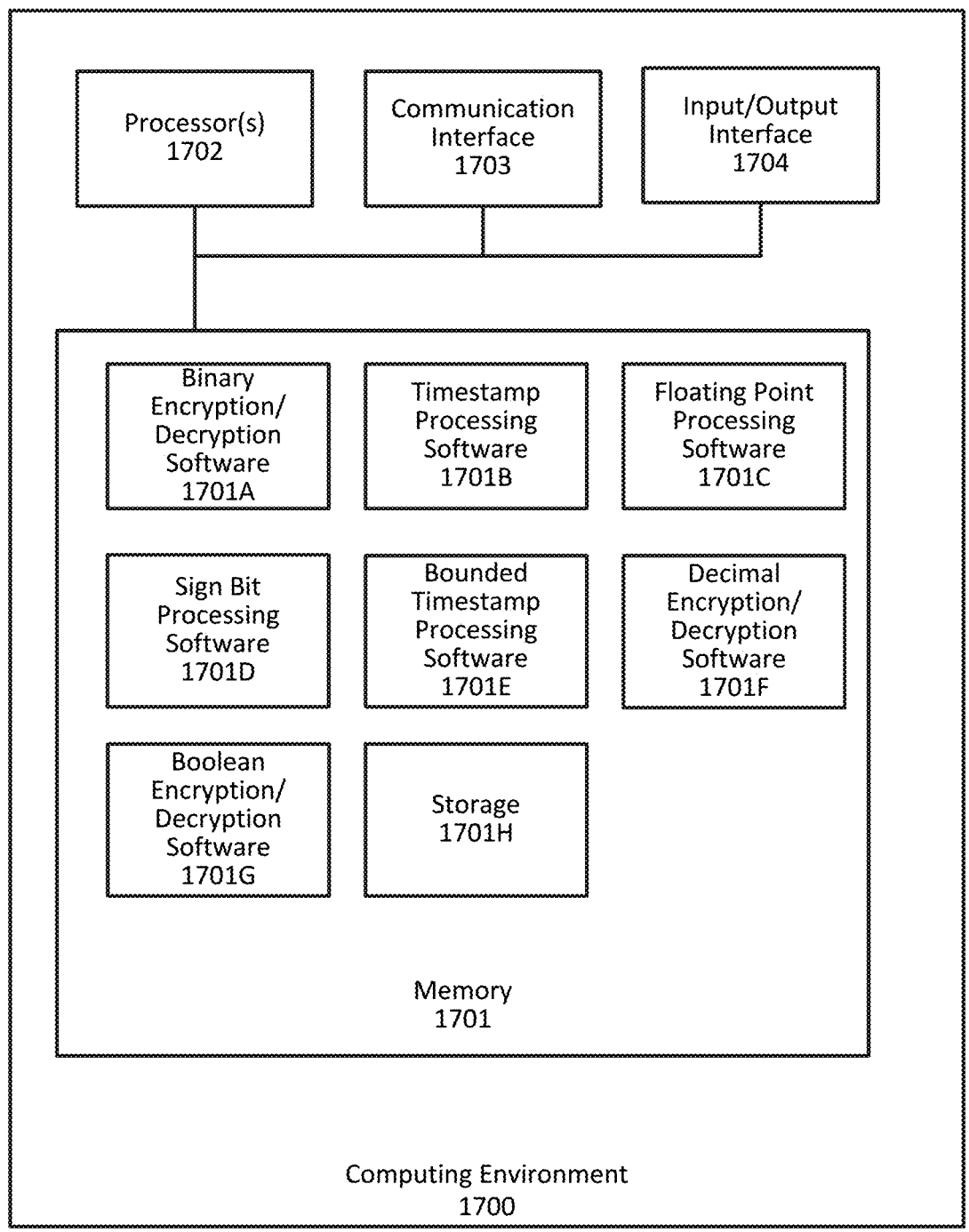
FIG. 17 illustrates a specialized computing environment for format-preserving encryption of a numerical value according to an exemplary embodiment.

FIG. 17 illustrates a specialized computing environment for format-preserving encryption of a numerical value according to an exemplary embodiment. Computing environment 1700 includes a memory 1701 that is a non-transitory computer-readable medium and can be volatile memory (e.g., registers, cache, RAM), non-volatile memory (e.g., ROM, EEPROM, flash memory, etc.), or some combination of the two.

As shown in FIG. 17, memory 1701 stores binary numerical value encryption/decryption software 1701A, timestamp processing software 1701B, floating point value processing software 1701C, sign bit processing software 1701D, bounded timestamp processing software 1701E, decimal encryption/decryption software 1701F, and Boolean data type encryption/decryption software 1701G. The software stores specialized instructions and data structures configured to perform the format and data-type preserving encryption techniques described herein.

Memory 1701 additionally includes a storage that can be used to store encrypted or decrypted values, intermediate values required for encryption or decryption (such as decimal timestamp values), and encryption and/or decryption keys.

All of the software stored within memory 1701 can be stored as a computer-readable instructions, that when executed by one or more processors 1702, cause the processors to perform the functionality described with respect to FIGS. 3-16.

Processor(s) 1702 execute computer-executable instructions and can be a real or virtual processors. In a multi-processing system, multiple processors or multicore processors can be used to execute computer-executable instructions to increase processing power and/or to execute certain software in parallel.

The computing environment additionally includes a communication interface 503, such as a network interface, which is used to monitor network communications, communicate with devices, applications, or processes on a computer network or computing system, collect data from devices on the network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Computing environment 1700 further includes input and output interfaces 1704 that allow users (such as system administrators) to provide input to the system and display or otherwise transmit information for display to users. For example, the input/output interface 1704 can be used to configure encryption/decryption rules and settings, and perform lookups of system information (such as UNIX time) used in the above-described processes.

An interconnection mechanism (shown as a solid line in FIG. 17), such as a bus, controller, or network interconnects the components of the computing environment 1700.

Input and output interfaces 1704 can be coupled to input and output devices. The input device(s) can be a touch input device such as a keyboard, mouse, pen, trackball, touch screen, or game controller, a voice input device, a scanning device, a digital camera, remote control, or another device that provides input to the computing environment. The output device(s) can be a display, television, monitor, printer, speaker, or another device that provides output from the computing environment 1700. Displays can include a graphical user interface (GUI) that presents options to users such as system administrators for configuring encryption and decryption processes.

The computing environment 1700 can additionally utilize a removable or non-removable storage, such as magnetic disks, magnetic tapes or cassettes, CD-ROMs, CD-RWs, DVDs, USB drives, or any other medium which can be used to store information and which can be accessed within the computing environment 1700.

The computing environment 1700 can be a set-top box, personal computer, a client device, a database or databases, or one or more servers, for example a farm of networked servers, a clustered server environment, or a cloud network of computing devices and/or distributed databases.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method executed by one or more computing devices for format-preserving encryption of a numerical value, the method comprising:

storing a binary numerical value, the binary numerical value comprising a plurality of binary bits;

dividing the plurality of binary bits into a plurality of bit groups and storing the plurality of bit groups in a plurality of bytes;

encrypting each byte in the plurality of bytes using a radix value corresponding to a quantity of binary bits from the binary numerical value in a bit group corresponding to that byte to generate a plurality of ciphertext bytes; and combining a quantity of least-significant bits from each ciphertext byte in the plurality of ciphertext bytes to generate a binary ciphertext value, wherein the quantity of least-significant bits combined from each ciphertext byte corresponds to the radix value used to generate that ciphertext byte.

2. The method of claim 1, wherein the binary numerical value comprises a sign bit and further comprising:
storing the sign bit in a leftmost bit of a sign byte; and
combining the leftmost bit of the sign byte with the binary ciphertext value to generate a signed binary ciphertext value.

3. The method of claim 1, wherein the binary numerical value comprises a floating point value comprising a sign bit and the plurality of binary bits, the plurality of binary bits including a plurality of exponent bits and a plurality of mantissa bits, and further comprising:
storing the sign bit in a sign byte;
encrypting the sign byte using a radix value of two to generate a ciphertext sign byte; and
combining the least-significant bit of the ciphertext sign byte with the binary ciphertext value to generate a signed binary ciphertext value.

4. The method of claim 1, further comprising:
receiving a timestamp;
converting the timestamp into a decimal timestamp; and
converting the decimal timestamp into the binary numerical value, the binary numerical value comprising a flag half-byte comprising a flag bit, and the plurality of binary bits.

5. The method of claim 4, further comprising:
storing the flag bit in a flag byte;
storing any remaining bits less significant than the flag bit within the flag half-byte in a remainder byte;
encrypting the remainder byte using a radix value corresponding to a quantity of remaining bits within the remainder byte to generate a ciphertext remainder byte;
applying a binary OR operation to the flag byte and the ciphertext remainder byte to generate a result flag half-byte;
combining the result flag half-byte with the binary ciphertext value to generate a timestamp binary ciphertext value; and
converting the timestamp binary ciphertext value into a ciphertext decimal value; and
converting the ciphertext decimal value into a ciphertext timestamp.

6. The method of claim 4, further comprising:
receiving a lower-bound time and an upper-bound time;
converting the lower-bound time and the upper-bound time into a decimal lower-bound and a decimal upper-bound; and
normalizing the decimal timestamp, the decimal upper-bound, and the decimal lower-bound prior to converting the decimal timestamp into the binary numerical value.

7. The method of claim 6, wherein converting the decimal timestamp into the binary numerical value comprises:
converting the normalized decimal upper-bound into a binary upper-bound;
converting the normalized decimal timestamp into a binary timestamp;

comparing the binary upper-bound and the binary timestamp to identify an initial instance of a half-byte in the binary timestamp that differs from a corresponding half-byte in the binary upper-bound;
identifying a leftmost bit in the identified half-byte in the binary timestamp that has a value of 0 where a corresponding bit in the corresponding half-byte in the binary upper-bound has a value of 1; and
designating the identified bit as the flag bit, the identified half-byte as the flag half-byte, and remaining bits in the binary timestamp as the plurality of binary bits.

8. The method of claim 6, further comprising:
storing any remaining bits less significant than the flag bit within the flag half-byte in a remainder byte;
encrypting the remainder byte using a radix value corresponding to a quantity of remaining bits within the remainder byte to generate a ciphertext remainder byte;
combining a quantity of least-significant bits in the ciphertext remainder byte corresponding to the radix value used to generate the ciphertext remainder byte with the binary ciphertext value to generate a timestamp binary ciphertext value;
converting the timestamp binary ciphertext value into a timestamp ciphertext decimal value;
generating a range-bound timestamp ciphertext decimal value by subtracting the ciphertext decimal value from the decimal upper-bound; and
converting the range-bound timestamp ciphertext decimal value into a rangebound ciphertext timestamp.

9. An apparatus for format-preserving encryption of a numerical value, the apparatus comprising:
one or more processors; and
one or more memories operatively coupled to at least one of the one or more processors and having instructions stored thereon that, when executed by at least one of the one or more processors, cause at least one of the one or more processors to:
store a binary numerical value, the binary numerical value comprising a plurality of binary bits;
divide the plurality of binary bits into a plurality of bit groups and storing the plurality of bit groups in a plurality of bytes;
encrypt each byte in the plurality of bytes using a radix value corresponding to a quantity of binary bits from the binary numerical value in a bit group corresponding to that byte to generate a plurality of ciphertext bytes; and
combine a quantity of least-significant bits from each ciphertext byte in the plurality of ciphertext bytes to generate a binary ciphertext value, wherein the quantity of least-significant bits combined from each ciphertext byte corresponds to the radix value used to generate that ciphertext byte.

10. The apparatus of claim 9, wherein at least one of the one or more memories has further instructions stored thereon that, when executed by at least one of the one or more processors, cause at least one of the one or more processors to:
receive a timestamp;
convert the timestamp into a decimal timestamp; and
convert the decimal timestamp into the binary numerical value, the binary numerical value comprising a flag half-byte comprising a flag bit, and the plurality of binary bits.

11. The apparatus of claim 10, wherein at least one of the one or more memories has further instructions stored thereon that, when executed by at least one of the one or more processors, cause at least one of the one or more processors to:
　　store the flag bit in a flag byte;
　　store any remaining bits less significant than the flag bit within the flag half-byte in a remainder byte;
　　encrypt the remainder byte using a radix value corresponding to a quantity of remaining bits within the remainder byte to generate a ciphertext remainder byte;
　　apply a binary OR operation to the flag byte and the ciphertext remainder byte to generate a result flag half-byte;
　　combine the result flag half-byte with the binary ciphertext value to generate a timestamp binary ciphertext value;
　　convert the timestamp binary ciphertext value into a ciphertext decimal value; and
　　convert the ciphertext decimal value into a ciphertext timestamp.

12. The apparatus of claim 10, wherein at least one of the one or more memories has further instructions stored thereon that, when executed by at least one of the one or more processors, cause at least one of the one or more processors to:
　　receive a lower-bound time and an upper-bound time;
　　convert the lower-bound time and the upper-bound time into a decimal lower-bound and a decimal upper-bound; and
　　normalize the decimal timestamp, the decimal upper-bound, and the decimal lower-bound prior to converting the decimal timestamp into the binary numerical value.

13. The apparatus of claim 12, wherein the instructions that, when executed by at least one of the one or more processors, cause at least one of the one or more processors to convert the decimal timestamp into the binary numerical value further cause at least one of the one or more processors to:
　　convert the normalized decimal upper-bound into a binary upper-bound;
　　convert the normalized decimal timestamp into a binary timestamp;
　　compare the binary upper-bound and the binary timestamp to identify an initial instance of a half-byte in the binary timestamp that differs from a corresponding half-byte in the binary upper-bound;
　　identify a leftmost bit in the identified half-byte in the binary timestamp that has a value of 0 where a corresponding bit in the corresponding half-byte in the binary upper-bound has a value of 1; and
　　designate the identified bit as the flag bit, the identified half-byte as the flag half-byte, and remaining bits in the binary timestamp as the plurality of binary bits.

14. The apparatus of claim 12, wherein at least one of the one or more memories has further instructions stored thereon that, when executed by at least one of the one or more processors, cause at least one of the one or more processors to:
　　store any remaining bits less significant than the flag bit within the flag half-byte in a remainder byte;
　　encrypt the remainder byte using a radix value corresponding to a quantity of remaining bits within the remainder byte to generate a ciphertext remainder byte;
　　combine a quantity of least-significant bits in the ciphertext remainder byte corresponding to the radix value used to generate the ciphertext remainder byte with the binary ciphertext value to generate a timestamp binary ciphertext value;
　　convert the timestamp binary ciphertext value into a timestamp ciphertext decimal value;
　　generate a range-bound timestamp ciphertext decimal value by subtracting the ciphertext decimal value from the decimal upper-bound; and
　　convert the range-bound timestamp ciphertext decimal value into a rangebound ciphertext timestamp.

15. At least one non-transitory computer-readable medium storing computer-readable instructions that, when executed by one or more computing devices, cause the computing devices to:
　　store a binary numerical value, the binary numerical value comprising a plurality of binary bits;
　　divide the plurality of binary bits into a plurality of bit groups and storing the plurality of bit groups in a plurality of bytes;
　　encrypt each byte in the plurality of bytes using a radix value corresponding to a quantity of binary bits from the binary numerical value in a bit group corresponding to that byte to generate a plurality of ciphertext bytes; and
　　combine a quantity of least-significant bits from each ciphertext byte in the plurality of ciphertext bytes to generate a binary ciphertext value, wherein the quantity of least-significant bits combined from each ciphertext byte corresponds to the radix value used to generate that ciphertext byte.

16. The at least one non-transitory computer-readable medium of claim 15, further storing computer-readable instructions that, when executed by at least one of the one or more computing devices, cause at least one of the one or more computing devices to:
　　receive a timestamp;
　　convert the timestamp into a decimal timestamp; and
　　convert the decimal timestamp into the binary numerical value, the binary numerical value comprising a flag half-byte comprising a flag bit, and the plurality of binary bits.

17. The at least one non-transitory computer-readable medium of claim 16, further storing computer-readable instructions that, when executed by at least one of the one or more computing devices, cause at least one of the one or more computing devices to:
　　store the flag bit in a flag byte;
　　store any remaining bits less significant than the flag bit within the flag half-byte in a remainder byte;
　　encrypt the remainder byte using a radix value corresponding to a quantity of remaining bits within the remainder byte to generate a ciphertext remainder byte;
　　apply a binary OR operation to the flag byte and the ciphertext remainder byte to generate a result flag half-byte;
　　combine the result flag half-byte with the binary ciphertext value to generate a timestamp binary ciphertext value;
　　convert the timestamp binary ciphertext value into a ciphertext decimal value; and
　　convert the ciphertext decimal value into a ciphertext timestamp.

18. The at least one non-transitory computer-readable medium of claim 16, further storing computer-readable instructions that, when executed by at least one of the one or more computing devices, cause at least one of the one or more computing devices to:

receive a lower-bound time and an upper-bound time;
convert the lower-bound time and the upper-bound time into a decimal lower-bound and a decimal upper-bound; and
normalize the decimal timestamp, the decimal upper-bound, and the decimal lower-bound prior to converting the decimal timestamp into the binary numerical value.

19. The at least one non-transitory computer-readable medium of claim 18, wherein the instructions that, when executed by at least one of the one or more computing devices, cause at least one of the one or more computing devices to convert the decimal timestamp into the binary numerical value further cause at least one of the one or more computing devices to:
convert the normalized decimal upper-bound into a binary upper-bound;
convert the normalized decimal timestamp into a binary timestamp;
compare the binary upper-bound and the binary timestamp to identify an initial instance of a half-byte in the binary timestamp that differs from a corresponding half-byte in the binary upper-bound;
identify a leftmost bit in the identified half-byte in the binary timestamp that has a value of 0 where a corresponding bit in the corresponding half-byte in the binary upper-bound has a value of 1; and
designate the identified bit as the flag bit, the identified half-byte as the flag half-byte, and remaining bits in the binary timestamp as the plurality of binary bits.

20. The at least one non-transitory computer-readable medium of claim 18, further storing computer-readable instructions that, when executed by at least one of the one or more computing devices, cause at least one of the one or more computing devices to:
store any remaining bits less significant than the flag bit within the flag half-byte in a remainder byte;
encrypt the remainder byte using a radix value corresponding to a quantity of remaining bits within the remainder byte to generate a ciphertext remainder byte;
combine a quantity of least-significant bits in the ciphertext remainder byte corresponding to the radix value used to generate the ciphertext remainder byte with the binary ciphertext value to generate a timestamp binary ciphertext value;
convert the timestamp binary ciphertext value into a timestamp ciphertext decimal value;
generate a range-bound timestamp ciphertext decimal value by subtracting the ciphertext decimal value from the decimal upper-bound; and
convert the range-bound timestamp ciphertext decimal value into a rangebound ciphertext timestamp.

* * * * *